(12) United States Patent
Kitayama et al.

(10) Patent No.: US 10,935,201 B2
(45) Date of Patent: Mar. 2, 2021

(54) LIGHTING APPARATUS DISPOSITION STRUCTURE FOR SADDLE RIDING VEHICLE

(71) Applicant: HONDA MOTOR CO., LTD., Tokyo (JP)

(72) Inventors: Kyosuke Kitayama, Wako (JP); Tsuyoshi Oguchi, Wako (JP); Yuichi Yokoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/899,542

(22) Filed: Feb. 20, 2018

(65) Prior Publication Data

US 2018/0252380 A1    Sep. 6, 2018

(30) Foreign Application Priority Data

Mar. 2, 2017  (JP) .............................. JP2017-039764
Mar. 2, 2017  (JP) .............................. JP2017-039765
Mar. 2, 2017  (JP) .............................. JP2017-039766

(51) Int. Cl.
*F21S 41/16*    (2018.01)
*F21S 41/24*    (2018.01)
(Continued)

(52) U.S. Cl.
CPC ............ *F21S 41/16* (2018.01); *B60Q 1/0011* (2013.01); *B60Q 1/0023* (2013.01);
(Continued)

(58) Field of Classification Search
CPC .......... F21S 41/16; F21S 41/24; F21S 45/465; F21S 43/251; B60Q 1/0011; B60Q 1/0023; B60Q 1/0094; B60Q 1/12; B62J 6/02
See application file for complete search history.

(56) References Cited

U.S. PATENT DOCUMENTS 3,667,435 A * 6/1972 Bygdnes ................. F01L 13/00
                                                        123/327
3,966,006 A * 6/1976 Cullinan .............. B62K 25/283
                                                        280/284
(Continued)

FOREIGN PATENT DOCUMENTS

DE   102013008075 A1 * 11/2014  ........... B60Q 1/0011
DE   102013008075 A1    11/2014
(Continued)

OTHER PUBLICATIONS

Machine Translation DE-102013008075-A1 Feb. 3, 2020 (Year: 2020).*

(Continued)

*Primary Examiner* — Erin Kryukova
*Assistant Examiner* — Christopher E Dunay
(74) *Attorney, Agent, or Firm* — Rankin, Hill & Clark LLP

(57) ABSTRACT

A lighting apparatus disposition structure for a saddle riding vehicle by which a traveling performance can be improved is disclosed. A lighting apparatus includes a laser element, a first light guide member and a second light guide member, a front light emission unit and a rear light emission unit, and a driver unit. The laser element and the driver unit are integrated as a light source unit. The light source unit is disposed between a head pipe that includes a steering axis for a front wheel and a pivot shaft that supports a rear wheel through a swing arm.

12 Claims, 24 Drawing Sheets

(51) Int. Cl.
  *B60Q 1/00* (2006.01)
  *B60Q 1/12* (2006.01)
  *F21S 45/465* (2018.01)
  *F21S 43/251* (2018.01)
  *B62J 6/02* (2020.01)
  *B62J 6/00* (2020.01)
  *B62J 45/415* (2020.01)
  *B60Q 1/04* (2006.01)

(52) U.S. Cl.
  CPC ......... *B60Q 1/0035* (2013.01); *B60Q 1/0094* (2013.01); *B60Q 1/12* (2013.01); *B62J 6/02* (2013.01); *F21S 41/24* (2018.01); *F21S 43/251* (2018.01); *F21S 45/465* (2018.01); *B60Q 1/0483* (2013.01); *B60Q 2300/136* (2013.01); *B62J 6/00* (2013.01); *B62J 45/4151* (2020.02)

(56) References Cited

U.S. PATENT DOCUMENTS

| | | | | |
|---|---|---|---|---|
| 7,415,051 | B1* | 8/2008 | Risser | H01S 3/041 372/34 |
| 2004/0190302 | A1* | 9/2004 | Mascadri | B62J 6/16 362/474 |
| 2004/0228144 | A1* | 11/2004 | Squicciarini | G02B 6/0006 362/555 |
| 2007/0160334 | A1* | 7/2007 | Cobb | B60Q 1/50 385/116 |
| 2008/0025039 | A1* | 1/2008 | Guillermo | A42B 3/044 362/556 |
| 2008/0031002 | A1 | 2/2008 | Venier | |
| 2011/0280033 | A1* | 11/2011 | Kishimoto | F21S 41/16 362/543 |
| 2011/0292667 | A1* | 12/2011 | Meyers | B60Q 1/38 362/465 |
| 2015/0043233 | A1* | 2/2015 | Bauer | B60Q 11/00 362/510 |

FOREIGN PATENT DOCUMENTS

| | | |
|---|---|---|
| EP | 3015348 A1 | 5/2016 |
| JP | H04-118329 A | 4/1992 |
| JP | 2010-064624 | 3/2010 |
| JP | 2013-232390 | 4/2013 |
| JP | 2013-067275 | 11/2013 |
| JP | 2013-232405 | 11/2013 |
| JP | 2015-155245 | 8/2015 |
| JP | 2015-214297 | 12/2015 |
| JP | 2016-000600 | 1/2016 |
| JP | 2016-030581 | 3/2016 |
| WO | 2015/190114 | 12/2015 |
| WO | 2016/035435 A1 | 3/2016 |

OTHER PUBLICATIONS

Honda VTX 1800 Technical Manual (Year: 2001).*
Japanese Office Action with English translation dated Apr. 23, 2019, 10 pages.
Japanese Office Action with English translation dated Jan. 8, 2019, 10 pages.
European Office Action dated Feb. 6, 2019, 6 pages.
European Search Report dated Aug. 2, 2018, 7 pages.
Japanese Office Action dated Aug. 27, 2019, English abstract included, 10 pages.
Japanese Office Action with English translation dated Dec. 3, 2019, 9 pages.
Japanese Office Action, Decision of Dismissal of Amendment, dated Mar. 17, 2020, English translation included, 7 pages.
Japanese Office Action, Decision of Refusal, dated Mar. 17, 2020, English translation included, 5 pages.
Notice of Termination of Reconsideration by Examiners before Appeal Proceedings dated Jun. 30, 2020, with English translation, 4 pages.
Reconsideration Report by Examiner before Appeal dated Jun. 24, 2020, with English translation, 8 pages.
Japanese Office Action with English translation dated Nov. 10, 2020, 7 pages.

* cited by examiner

LIGHTING APPARATUS DISPOSITION STRUCTURE FOR SADDLE RIDING VEHICLE

INCORPORATION BY REFERENCE

The present application claims priority under 35 U.S.C. § 119 to Japanese Patent Application No. 2017-039764 filed on Mar. 2, 2017, Japanese Patent Application No. 2017-039765 filed on Mar. 2, 2017 and Japanese Patent Application No. 2017-039766 filed on Mar. 2, 2017. The content of the applications is incorporated herein by reference in its entirety.

TECHNICAL FIELD

The present invention relates to a lighting apparatus disposition structure for a saddle riding vehicle.

BACKGROUND ART

Conventionally, as a lighting apparatus disposition structure for a vehicle, a structure is known in which a light emission unit for emitting light as an indicator lamp is disposed at a front portion, side portions and a rear portion of a vehicle and a laser element connected to each light emission unit through a light guide member is disposed on the inner side of a vehicle body (for example, refer to Patent Document 1).

PRIOR ART DOCUMENT

Patent Document

[Patent Document 1]
Japanese Patent Laid-Open No. 2013-232405

SUMMARY OF THE INVENTION

Problem to be Solved by the Invention

In the Patent Document 1, a driver unit for driving the laser element to emit light is provided for the laser element, and a light source unit configured from the laser element and the driver unit is comparatively high in weight. Therefore, although there is no problem in weight when the light source unit is incorporated in a four-wheeled vehicle, where the light source unit is incorporated in a saddle riding vehicle such as a motorcycle, it has an influence on the traveling performance of the vehicle depending upon the disposing location thereof. Further, the light source unit is comparatively great in volume, and there is no problem in size where it is incorporated in a four-wheeled vehicle. However, where the light source unit is incorporated in a saddle riding vehicle that is limited in vehicle body space such as a motorcycle, it is difficult to dispose the light source unit.

It is an object of the present invention to provide a lighting apparatus disposition structure for a saddle riding vehicle by which the traveling performance is enhanced and in which a lighting apparatus can be disposed effectively.

Means for Solving the Problem

According to an aspect of the present invention, there is provided a lighting apparatus disposition structure for a saddle riding vehicle in which a lighting apparatus (10, 100, 120, 210) including a laser light source (17) that emits light, a light guide unit (14, 16, 104, 124, 126, 214, 216) that guides the light from the laser light source (17) to a desired position, and a light emission unit (12, 13, 122A, 122B, 123, 212A, 212B, 213) provided at a tip end of the light guide unit (14, 16, 104, 124, 126, 214, 216) and configured to irradiate the light from the light guide unit (14, 16, 104, 124, 126, 214, 216) upon surroundings of the vehicle is incorporated, wherein the laser light source (17) is disposed between a head pipe (31, 141, 231) including a steering axis (31a, 141a, 231a) for a front wheel (22, 132, 222) and a pivot shaft (27, 162, 227) that supports a rear wheel (23, 113, 223) through a rocking member (28, 161, 228).

The lighting apparatus disposition structure for a saddle riding vehicle may be configured such that the lighting apparatus (10, 100, 120, 210) further includes a driving unit (18, 108) for driving the laser light source (17) to emit light, and a light source unit (11, 88, 101) configured from the laser light source (17) or from the laser light source (17) and the driving unit (18, 108) is disposed between a power source (45, 164, 245) configured to drive the front wheel (22, 132, 222) or the rear wheel (23, 113, 223) and an energy source supplying unit (25, 171, 241) configured to supply an energy source to the power source (45, 164, 245).

Alternatively, the lighting apparatus disposition structure for a saddle riding vehicle may be configured such that the lighting apparatus (10, 100, 120, 210) further includes a driving unit (18, 108) for driving the laser light source (17) to emit light, and a light source unit (11, 88, 101) configured from the laser light source (17) or from the laser light source (17) and the driving unit (18, 108) is disposed on an inner side of a vehicle body frame (21, 131, 221) that includes the head pipe (31, 141, 231) and the pivot shaft (27, 162, 227).

Alternatively, the lighting apparatus disposition structure for a saddle riding vehicle may be configured such that the lighting apparatus (10, 100, 120, 210) further includes a driving unit (18, 108) for driving the laser light source (17) to emit light, and part of a light source unit (11, 88, 101) configured from the laser light source (17) or from the laser light source (17) and the driving unit (18, 108) is exposed to an outside.

Alternatively, the lighting apparatus disposition structure for a saddle riding vehicle may be configured such that the lighting apparatus (10, 100, 120, 210) further includes a driving unit (18, 108) for driving the laser light source (17) to emit light, and a pair of left and right light source units (11, 88, 101) are provided each of which is configured from the laser light source (17) or from the laser light source (17) and the driving unit (18, 108).

Alternatively, the lighting apparatus disposition structure for a saddle riding vehicle may be configured such that the lighting apparatus (10, 100, 120, 210) further includes a driving unit (18, 108) for driving the laser light source (17) to emit light, and a light source unit (11, 88, 101) configured from the laser light source (17) or from the laser light source (17) and the driving unit (18, 108) includes a fin (18c) on a plane that connects a side face of the power source (45, 164, 245) and a side face of the energy source supplying unit (25, 171, 241) or a plane offset in a vehicle widthwise direction with respect to the plane.

Alternatively, the lighting apparatus disposition structure for a saddle riding vehicle may be configured such that the lighting apparatus (10, 100, 120, 210) further includes a driving unit (18, 108) for driving the laser light source (17) to emit light, and a light source unit (11, 88, 101) configured from the laser light source (17) or from the laser light source (17) and the driving unit (18, 108) is cooled by cooling water cooled by a radiator (57, 172, 257).

Alternatively, the lighting apparatus (10, 100, 120, 210) may be configured from the laser light source (17) and the driving unit (18, 108) integrated with each other as the light source unit (11, 88, 101).

According to another aspect of the present invention, there is provided a lighting apparatus disposition structure for a saddle riding vehicle in which a lighting apparatus (10A, 120A, 210A, 300A) including a laser light source (17, 17L, 17R, 91A) that emits light, a light guide unit (14A, 124C, 214C, 304J) that guides the light from the laser light source (17, 17L, 17R, 91A) to a desired position, and a light emission unit (12, 122A, 122B, 212A, 212B, 302A, 302B) provided at a tip end of the light guide unit (14A, 124C, 214C, 304J) and configured to irradiate the light from the light guide unit (14A, 124C, 214C, 304J) upon surroundings of the vehicle is incorporated, wherein the laser light source (17, 17L, 17R, 91A) is disposed between a rocking member (28, 161, 228) that supports a rear wheel (23) for upward and downward rocking motion and a seat (24, 134, 224) for being seated by an occupant as viewed in side elevation.

The lighting apparatus disposition structure for a saddle riding vehicle may be configured such that the lighting apparatus (10A, 120A, 210A, 300A) further includes a driving unit (18, 18L, 18R, 92) for driving the laser light source (17, 17L, 17R, 91A) to emit light, and at least part of a light source unit (11, 11L, 11R, 88) configured from the laser light source (17, 17L, 17R, 91A) or from the laser light source (17, 17L, 17R, 91A) and the driving unit (18, 18L, 18R, 92) is covered with a rear cover (76, 195, 276) provided at a rear portion of a vehicle body.

Alternatively, the lighting apparatus disposition structure for a saddle riding vehicle may be configured such that the lighting apparatus (10A, 120A, 210A, 300A) further includes a driving unit (18, 18L, 18R, 92) for driving the laser light source (17, 17L, 17R, 91A) to emit light, and a light source unit (11, 11L, 11R, 88) configured from the laser light source (17, 17L, 17R, 91A) or from the laser light source (17, 17L, 17R, 91A) and the driving unit (18, 18L, 18R, 92) is disposed on an inner side of a vehicle body frame (34, 143, 234).

Alternatively, the lighting apparatus disposition structure for a saddle riding vehicle may be configured such that the lighting apparatus (10A, 120A, 210A, 300A) further includes a driving unit (18, 18L, 18R, 92) for driving the laser light source (17, 17L, 17R, 91A) to emit light, and part of a light source unit (11, 11L, 11R, 88) configured from the laser light source (17, 17L, 17R, 91A) or from the laser light source (17, 17L, 17R, 91A) and the driving unit (18, 18L, 18R, 92) is exposed to an outside.

Alternatively, the lighting apparatus disposition structure for a saddle riding vehicle may be configured such that the lighting apparatus (10A, 120A, 210A, 300A) further includes a driving unit (18, 18L, 18R, 92) for driving the laser light source (17, 17L, 17R, 91A) to emit light, and a pair of left and right light source units (11, 11L, 11R) are provided each of which is configured from the laser light source (17, 17L, 17R, 91A) or from the laser light source (17, 17L, 17R, 91A) and the driving unit (18, 18L, 18R, 92).

Alternatively, the lighting apparatus disposition structure for a saddle riding vehicle may be configured such that the lighting apparatus (10A, 120A, 210A, 300A) further includes a driving unit (18, 18L, 18R, 92) for driving the laser light source (17, 17L, 17R, 91A) to emit light, and a battery (254) is disposed below the seat (224), and the light source unit (11) is configured from the laser light source (17, 17L, 17R, 91A) or from the laser light source (17, 17L, 17R, 91A) and the driving unit (18, 18L, 18R, 92) is disposed behind the battery (254).

Alternatively, the lighting apparatus disposition structure for a saddle riding vehicle may be configured such that the lighting apparatus (10A, 120A, 210A, 300A) further includes a driving unit (18, 18L, 18R, 92) for driving the laser light source (17, 17L, 17R, 91A) to emit light, and the rear cover is a rear fender (76, 195, 276), and the light source unit (11, 11L, 11R, 88) configured from the laser light source (17, 17L, 17R, 91A) or from the laser light source (17, 17L, 17R, 91A) and the driving unit (18, 18L, 18R, 92) is attached to the rear fender (76, 195, 276).

Alternatively, the lighting apparatus disposition structure for a saddle riding vehicle may be configured such that the rear fender (76, 195, 276) has an opening (76a, 76b) provided herein, and the light source unit (11, 11L, 11R, 88) configured from the laser light source (17, 17L, 17R, 91A) or from the laser light source (17, 17L, 17R, 91A) and the driving unit (18, 18L, 18R, 92) is exposed to an outside through the opening (76a, 76b).

Alternatively, the lighting apparatus disposition structure for a saddle riding vehicle may be configured such that the opening (76a, 76b) of the rear fender (76, 195, 276) is formed open downwardly, and the light source unit (11, 11L, 11R, 88) configured from the laser light source (17, 17L, 17R, 91A) or from the laser light source (17, 17L, 17R, 91A) and the driving unit (18, 18L, 18R, 92) has a fin (18c, 92c) formed at a portion thereof that is exposed to the outside.

Alternatively, the lighting apparatus (10A, 120A, 210A, 300A) may be configured from the laser light source (17, 17L, 17R, 91A) and the driving unit (18, 18L, 18R, 92) integrated with each other as the light source unit (11, 11L, 11R, 88).

Advantageous Effects of the Invention

In the lighting apparatus disposition structure for a saddle riding vehicle according to the first aspect of the present invention, since the light source unit is disposed between the head pipe including the steering axis for the front wheel and the pivot shaft that supports the rear wheel through the rocking member, the light source unit can be disposed at a near position to the center of gravity of the vehicle and concentration of the mass can be achieved. Consequently, the traveling performance of the vehicle can be enhanced.

In the lighting apparatus disposition structure for a saddle riding vehicle described above, since the light source unit is disposed between the power source that drives the front wheel or the rear wheel and the energy source supplying unit that supplies an energy source to the power source, the light source unit can be disposed at a nearer position to the vehicle barycenter and concentration of the mass can be achieved. Consequently, the traveling performance of the vehicle can be enhanced.

Further, in the lighting apparatus disposition structure for a saddle riding vehicle, since the light source unit is disposed on the inner side of the vehicle body frame that includes the head pipe and the pivot shaft, the light source unit can be protected by the vehicle body frame.

Further, in the lighting apparatus disposition structure for a saddle riding vehicle, since part of the light source unit is exposed to an outside, the light source unit can be cooled by traveling wind while the light source is protected by the vehicle body frame.

Further, in the lighting apparatus disposition structure for a saddle riding vehicle, since the light source units are provided in left and right pair, a light amount and an irradiation range of the lighting apparatus can be secured readily.

Further, in the lighting apparatus disposition structure for a saddle riding vehicle, since, in the light source unit, the fin is provided on the plane that connects a side face of the power source and a side face of the energy source supplying unit or a plane offset in the vehicle widthwise direction from the plane, the light source unit can be cooled still more by the fin while the light source unit is protected.

Further, in the lighting apparatus disposition structure for a saddle riding vehicle, since the light source unit is cooled by cooling water cooled by the radiator, the cooling performance of the light source unit can be enhanced still more.

Further, in the lighting apparatus disposition structure for a saddle riding vehicle, since the lighting apparatus includes the driving unit for driving the laser light source to emit light and the laser light source and the driving unit are integrated as the light source unit, the number of parts can be decreased and the cost can be reduced.

In the lighting apparatus disposition structure for a saddle riding vehicle according to the second aspect of the present invention, since the light source unit is disposed between the rocking member that supports the rear wheel for upward and downward rocking motion and the seat to be seated by an occupant as viewed in side elevation, an existing vehicle body space can be utilized effectively and the lighting apparatus can be disposed easily on the vehicle body.

In the lighting apparatus disposition structure for a saddle riding vehicle, since at least part of the light source unit is covered with the rear cover provided at a rear portion of the vehicle body, the appearance can be enhanced.

Further, in the lighting apparatus disposition structure for a saddle riding vehicle, since the light source unit is disposed on the inner side of the vehicle body frame, the light source unit can be protected by the vehicle body frame and can be covered from the sides to enhance the appearance.

Further, in the lighting apparatus disposition structure for a saddle riding vehicle, since part of the light source unit is exposed to an outside, the light source unit can be hit traveling wind and the light source unit can be cooled positively thereby.

Further, in the lighting apparatus disposition structure for a saddle riding vehicle, since the light source units are provided in left and right pair, a light amount and an irradiation range of the lighting apparatus can be secured easily.

Further, in the lighting apparatus disposition structure for a saddle riding vehicle, since the battery is disposed below the seat and the light source unit is disposed behind the battery, the length of a wire harness for connecting the battery and the light source unit to each other can be reduced and the cost and the weight can be reduced. Further, the battery and the light source unit are disposed in a concentrated manner below the seat, and consequently, concentration of the mass on the proximity of the center of gravity of vehicle body can be achieved and the traveling performance can be enhanced.

Further, in the lighting apparatus disposition structure for a saddle riding vehicle, since the rear cover is a rear fender and the light source unit is attached to the rear fender, the light source unit can be supported utilizing the existing part and a supporting member for the light source unit need not be provided specially and the cost can be suppressed.

Further, in the lighting apparatus disposition structure for a saddle riding vehicle, since the opening is provided in the rear fender and the light source unit is exposed from the opening to an outside, traveling wind or an air flow generated by rotation of the rear wheel can be caused to hit upon the light source unit through the opening and the light source unit can be cooled also upon low-speed traveling.

Further, in the lighting apparatus disposition structure for a saddle riding vehicle, since the opening of the rear fender is formed open downwardly and the light source unit has the fin formed at a lower portion thereof exposed to the outside, the light source unit can be cooled still more by causing traveling wind or an air flow generated by rotation of the rear wheel to hit upon the fin.

Further, in the lighting apparatus disposition structure for a saddle riding vehicle, since the lighting apparatus includes the driving unit for driving the laser light source to emit light and the laser light source and the driving unit are integrated as the light source unit, the number of parts can reduced and the cost can be reduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 17A and 17B are views (sixth embodiment) depicting left and right light source units as viewed from below a rear fender, wherein FIG. 17A is a view as viewed in the direction indicated an arrow mark XVII of FIG. 15 and FIG.

Figure 17A:
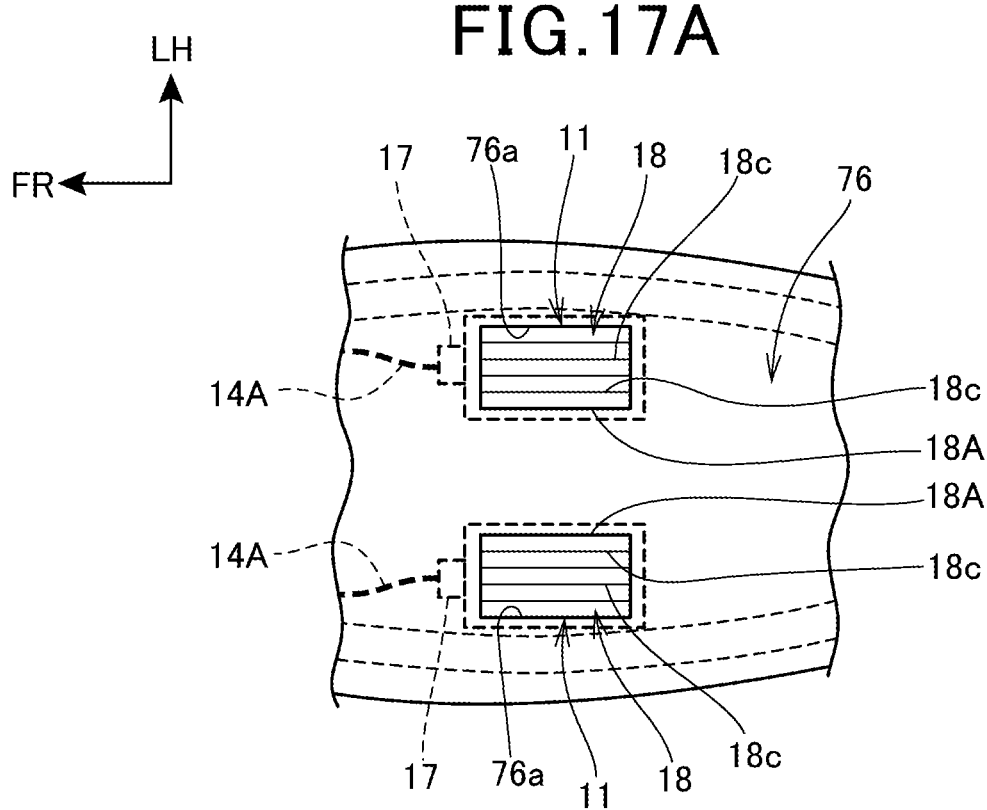

17B is a view depicting a modification to the light and right light source units of FIG. 17A.

Figure 18:
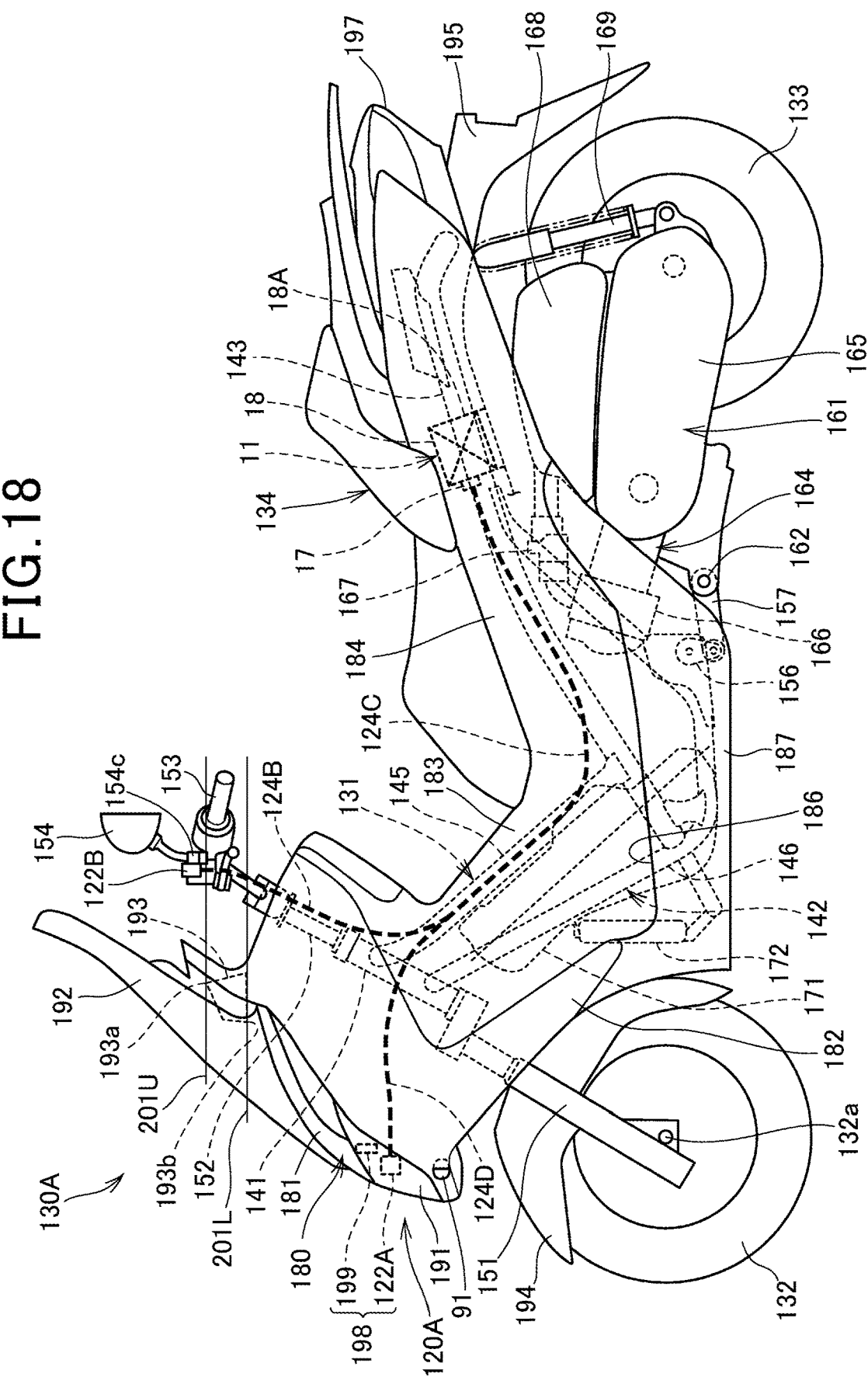

FIG. 18 is a left side elevational view of a motorcycle including a lighting apparatus of a seventh embodiment according to the present invention.

Figure 19:
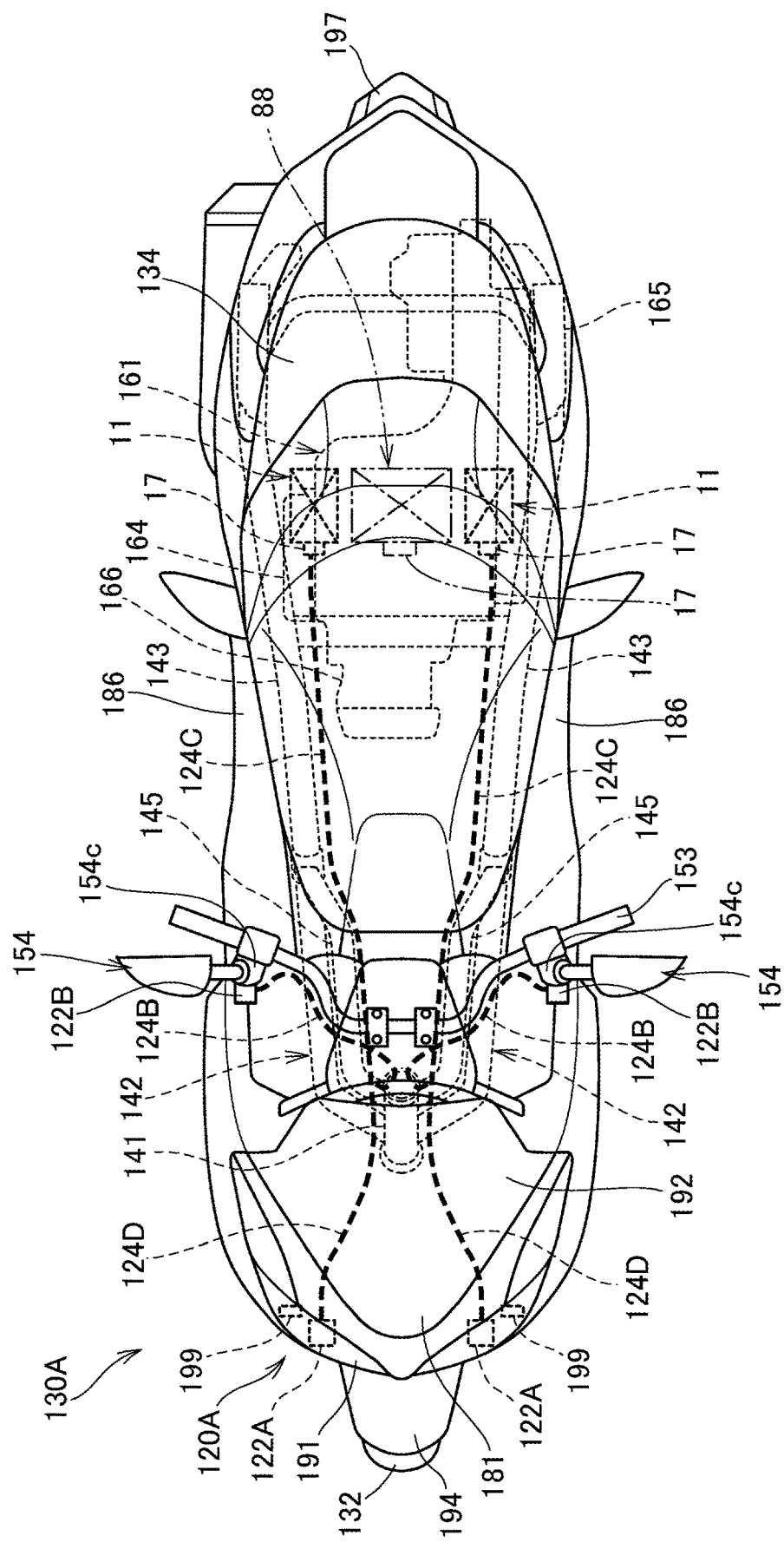

FIG. 19 is a top plan view (seventh embodiment) of the motorcycle depicting the lighting apparatus.

Figure 20:
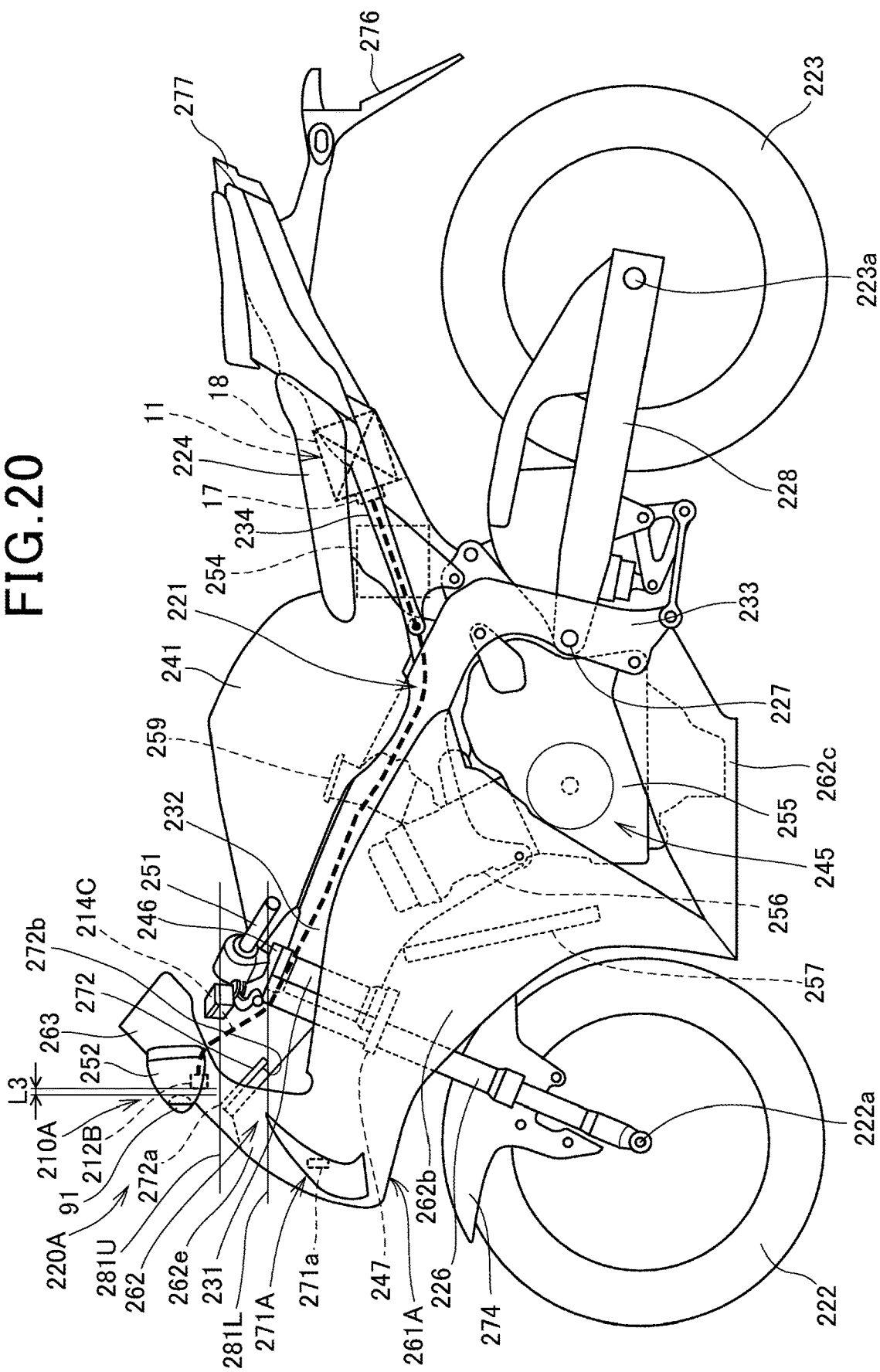

FIG. 20 is a left side elevational view of the motorcycle including a lighting apparatus of an eighth embodiment according to the present invention.

Figure 21:
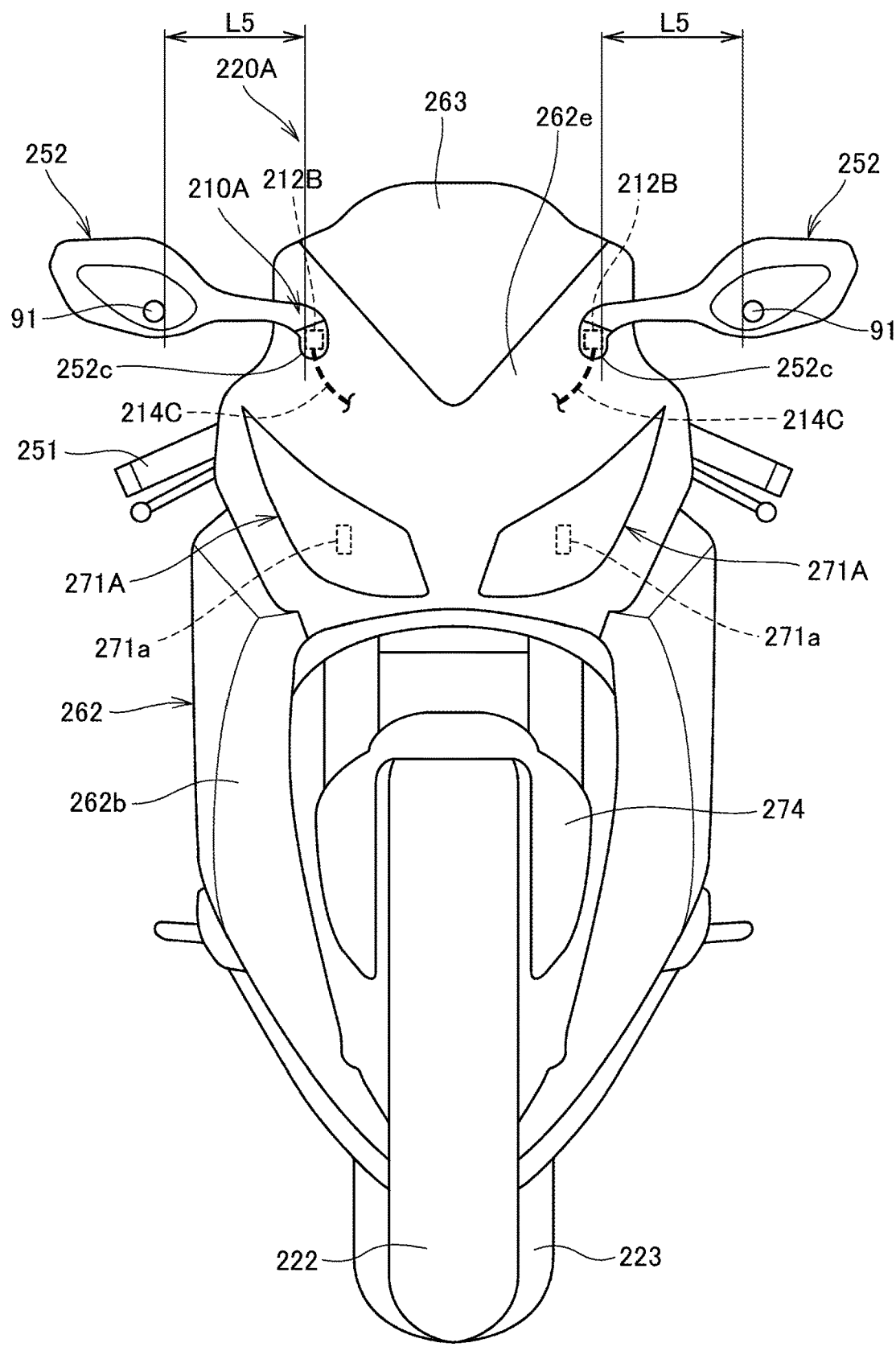

FIG. 21 is a front elevational view (eighth embodiment) of the motorcycle depicting part of the lighting apparatus.

Figure 22:
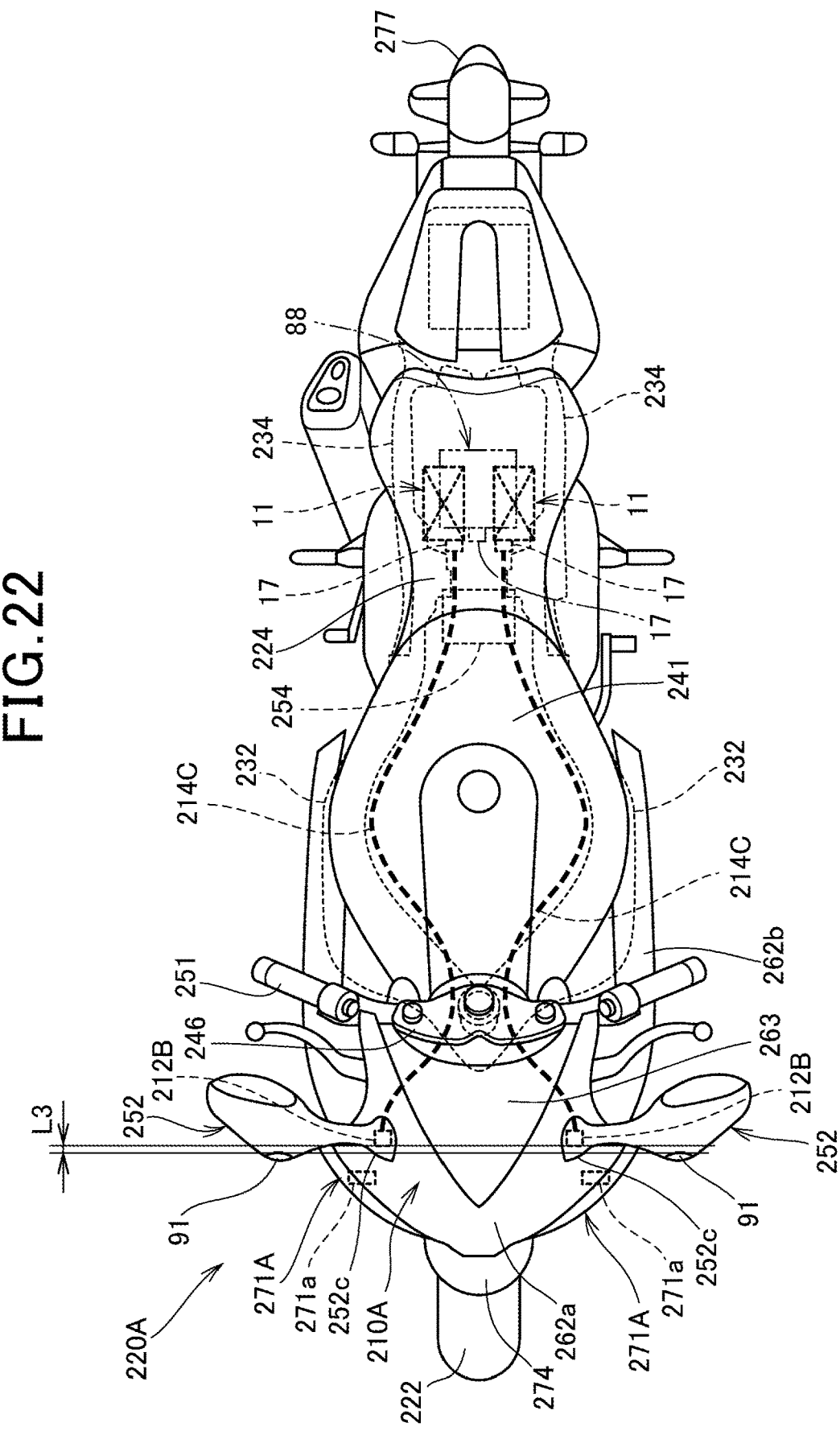

FIG. 22 is a top plan view (eighth embodiment) of the motorcycle depicting the lighting apparatus.

Figure 23:
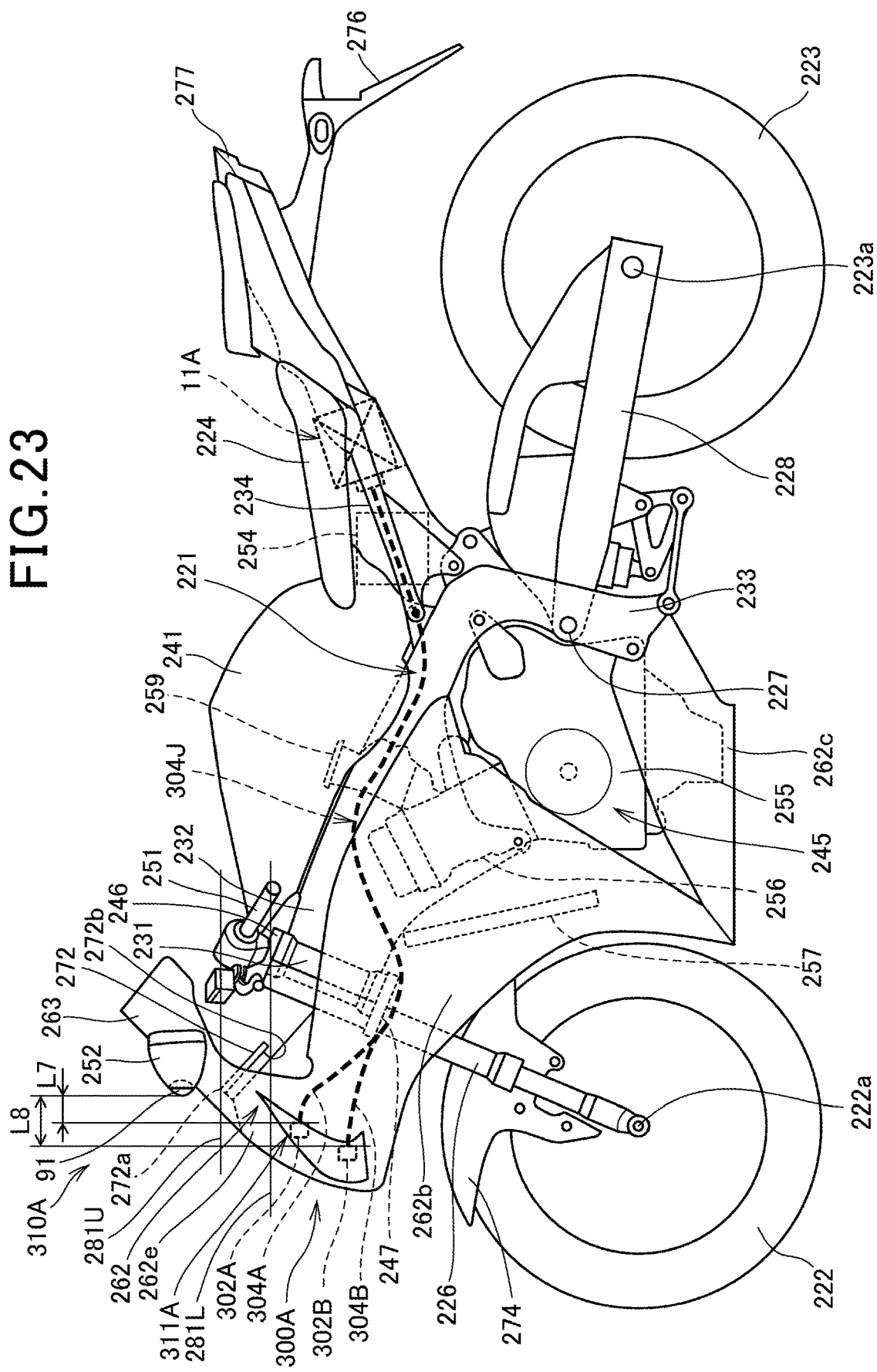

FIG. 23 is a left side elevational view of a motorcycle including a lighting apparatus of a ninth embodiment according to the present invention.

Figure 24:
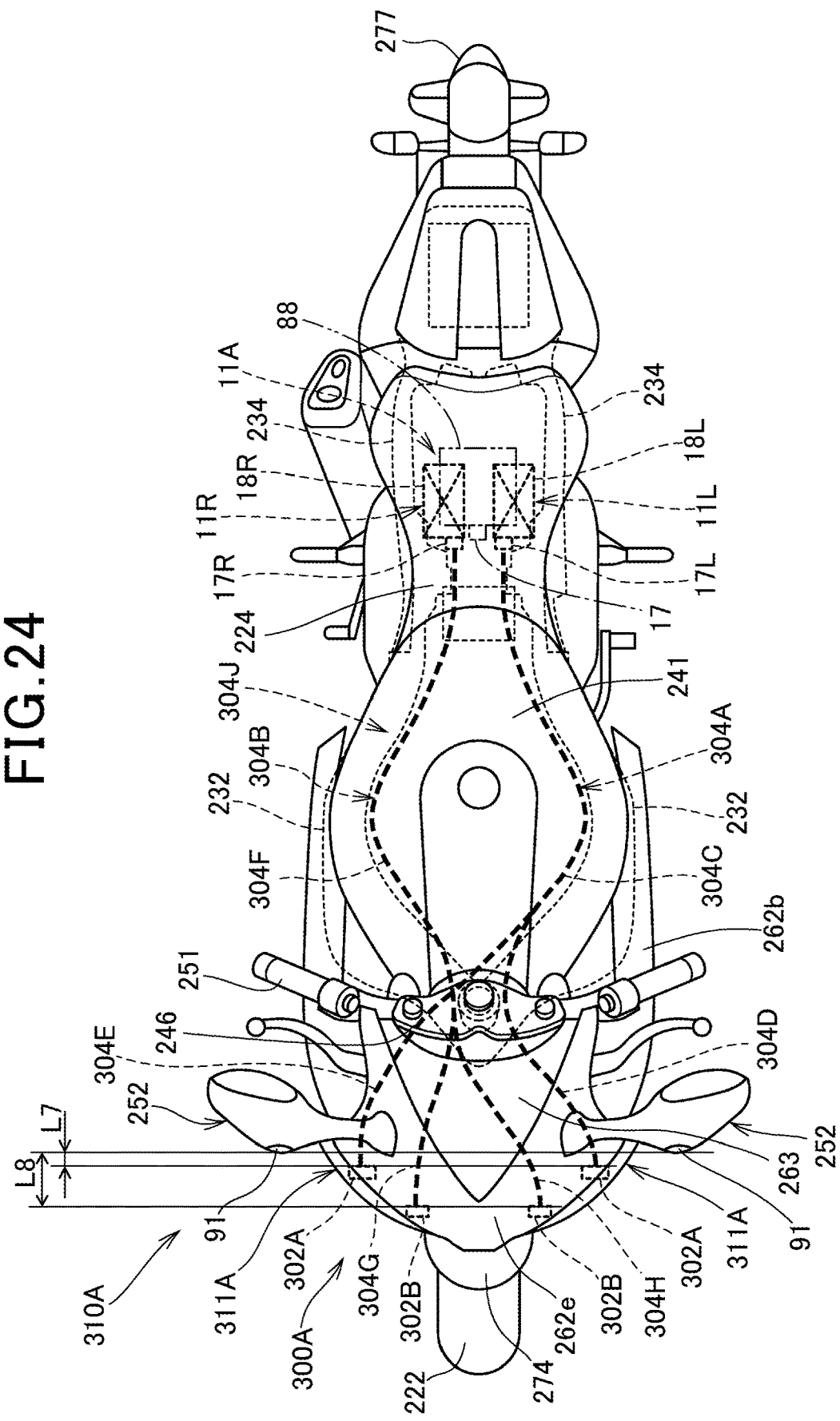

FIG. 24 is a top plan view (ninth embodiment) of the motorcycle depicting the lighting apparatus.

MODES FOR CARRYING OUT THE INVENTION

In the following, embodiments of the present invention are described with reference to the drawings. It is to be noted that, unless otherwise specified, directions such as forward, rearward, leftward and rightward directions in the following description are same as those of a vehicle body described below. Further, in the figures, reference character FR indicates a forward direction of the vehicle body; reference character UP indicates an upward direction of the vehicle body; and reference character LH indicates a leftward direction of the vehicle body.

First Embodiment

Figure 1:
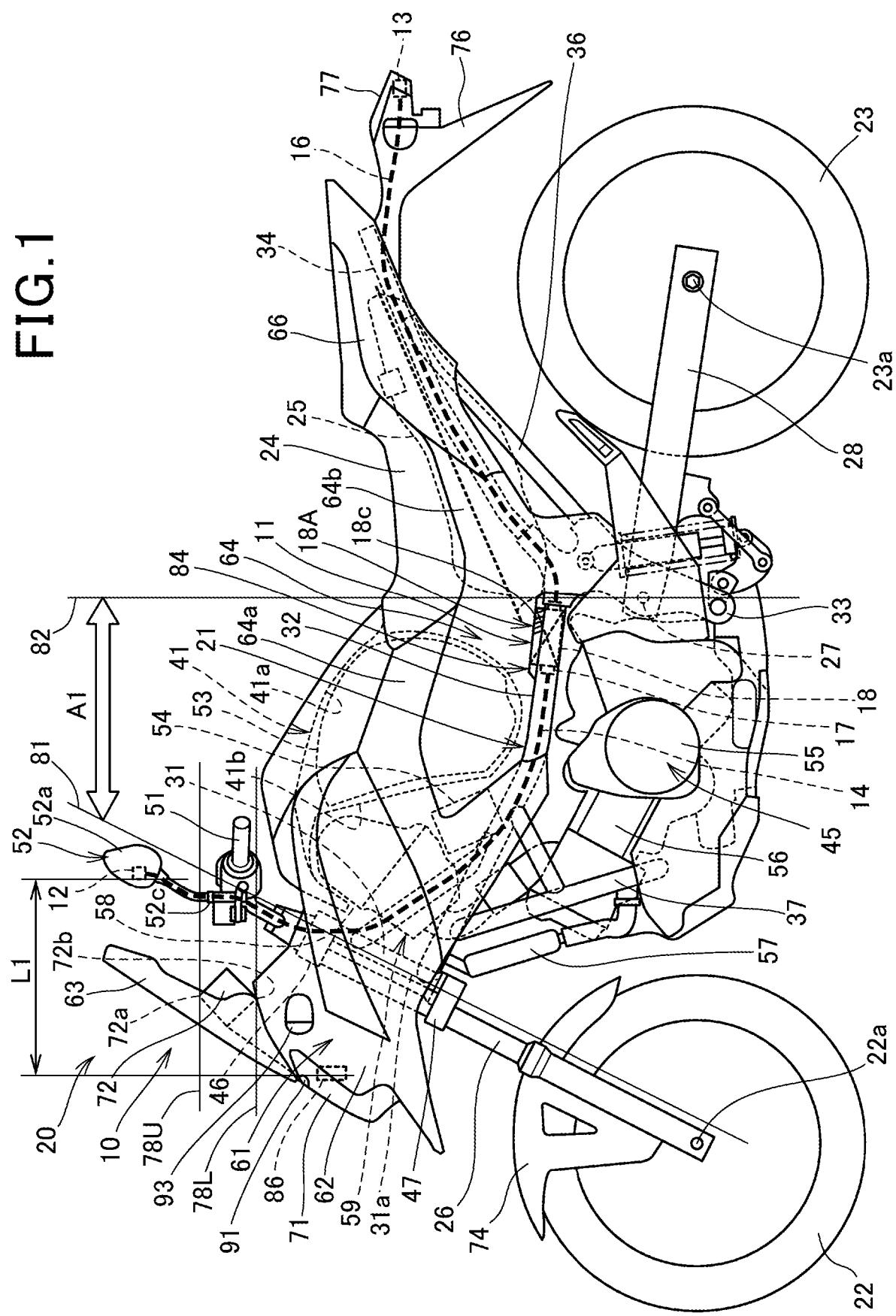
FIG. 1 is a left side elevational view of a motorcycle including a lighting apparatus of a first embodiment according to the present invention.

FIG. 1 is a left side elevational view of a motorcycle 20 including a lighting apparatus 10 of a first embodiment according to the present invention.

The motorcycle 20 is a saddle riding vehicle of the multipurpose type including a vehicle body frame 21, a front wheel 22, a rear wheel 23 and a seat 24.

The vehicle body frame 21 includes a head pipe 31, a pair of left and right main frames 32, a pair of left and right pivot frames 33, a pair of left and right seat frames 34, a pair of left and right sub frames 36 and a pair of left and right down frames 37.

The head pipe 31 configures a front end portion of the vehicle body frame 21 and supports a front fork 26, which supports the front wheel 22, for steering operation. The main frames 32 extend obliquely rearwardly downwards from the head pipe 31. A front accommodation box 41 is supported on the main frames 32. The pivot frames 33 extend downwardly from a rear end portion of the main frames 32 and support a pivot shaft 27 extending in the vehicle widthwise direction. The seat frames 34 extend obliquely rearwardly upwards from a rear end portion of the main frames 32 and support the seat 24 and a fuel tank 25 thereon. The sub frames 36 couple the pivot frames 33 and a rear end of the seat frames 34. The down frames 37 extend obliquely rearwardly downwards from a front end portion of the main frames 32 and support an engine 45 in cooperation with the pivot frames 33.

The front fork 26 includes a top bridge 46 and a bottom bridge 47 that couple left and right portions thereof. A handlebar 51 is attached to an upper face of the top bridge 46, and the front wheel 22 is supported at a lower end portion of the front fork 26 through an axle 22a. A pair of left and right rear view mirrors 52 are attached to the handlebar 51.

A swing arm 28 is attached for rocking motion to the pivot shaft 27, and the rear wheel 23 is supported at a rear end portion of the swing arm 28 through an axle 23a.

The front accommodation box 41 is disposed at a location at which a fuel tank is disposed conventionally, and a helmet 53 is accommodated in a large size accommodation chamber 41a. A recessed portion 41a recessed upwardly is formed in front of the accommodation chamber 41a in the front accommodation box 41, and a battery 54 is disposed in the recessed portion 41b.

The engine 45 includes a crankcase 55 and a cylinder unit 56 extending obliquely forwardly upwards from a front portion of the crankcase 55. A radiator 57 for water-cooling the engine 45 is disposed at a portion obliquely forwardly upwards from the cylinder unit 56. An intake system 59 including an air cleaner 58 and so forth is connected to an upper portion of the cylinder unit 56.

The vehicle body frame 21 is covered with a vehicle body cover 61.

The vehicle body cover 61 includes a front cowl 62, a windscreen 63, a side cover 64 and a rear cover 66.

The front cowl 62 covers the front and the sides of the head pipe 31 and the front fork 26 and the sides of the front accommodation box 41. A headlamp 71 is disposed on the inner side of the front cowl 62. The windscreen 63 is attached to an upper end portion of the front cowl 62. A meter unit 72 is disposed at an upper portion of the front cowl 62 in the rear of the windscreen 63. The side cover 64 is configured from a front side cover 64a and a rear side cover 64b and covers the sides of the front accommodation box 41 and a lower portion of the seat 24. The rear cover 66 covers a lower portion of the seat 24.

The front wheel 22 is covered with a front fender 74 from above. The rear wheel 23 is covered with a rear fender 76 from the upward portion. A tail lamp 77 is attached to a rear end portion of the rear fender 76.

The lighting apparatus 10 includes a light source unit 11, a front light emission unit 12, a rear light emission unit 13, a first light guide member 14 and a second light guide member 16.

The light source unit 11 is disposed on the inner side of the left and right main frames 32 and is configured from a laser element 17 and a driver unit 18.

The laser element 17 is an auxiliary light source for high beam light emission added for assisting the headlamp 71, more particularly, for a high beam light source provided in the headlamp 71. The driver unit 18 drives the laser element 17 to emit laser light, and includes a heat sink 18A for cooling the laser element 17. The laser element 17 is attached to the heat sink 18A. A plurality of cooling fins 18c for urging cooling by traveling wind are provided on the heat sink 18A.

The front light emission unit 12 is provided on a rear view mirror 52, more particularly, on a rear view mirror main body 52a configuring an upper portion of the rear view mirror 52. As a result, the front light emission unit 12 is disposed at a heightwise position same as that of the meter unit 72 or at a higher position than that of the meter unit 72. It is to be noted that, in FIG. 1, in order to facilitate grasping of a heightwise position of the front light emission unit 12, a horizontal auxiliary line 78U that passes an upper end 72a of the meter unit 72 and another horizontal auxiliary line 78L that passes a lower end 72b of the meter unit 72 are drawn. The front light emission unit 12 is disposed above the lower side auxiliary line 78L, and preferably the front light emission unit 12 is disposed above the upper side auxiliary line 78U. As described above, since the front light emission unit 12 is disposed at a high position of the vehicle body, it can be made it easy to secure an irradiation range and an irradiation distance of laser light emitted from the front light emission unit 12.

The front light emission unit 12 may include at least one of a lens for refracting laser light to be irradiate and a reflector for reflecting laser light to be irradiated. The lens or the reflector just described distributes laser light to be irradiate to a predetermined range in front of the vehicle. The lens and reflector may be included in a light emission unit of other different embodiments.

The rear light emission unit 13 is disposed in the tail lamp 77 and serves as a light source for a brake lamp or a position lamp.

The first light guide member 14 and the second light guide member 16 are configured individually from an optical fiber and can be curved freely in accordance with the shape of the wiring position in the vehicle body.

The light source unit 11 is disposed in a region A1 between the head pipe 31 and the pivot shaft 27 in the vehicle forward and rearward direction (more particularly, between a linear line 81 overlapping with an axial line 31a that passes the center of the head pipe 31 and a vertical line 82 that passes the center of the pivot haft 27). The light source unit 11 may overlap with the head pipe 31 or the pivot shaft 27 as viewed in side elevation. The axial line 31a of the head pipe 31 functions as an steering axis for the front wheel 22, more particularly, as a steering axis for the front fork 26 on which the front wheel 22 is supported, and the front wheel 22 is steered around the axial line 31a.

As described above, by disposing the light source unit 11 in the region A1, the light source unit 11 having a comparatively high weight can be provided near to the center of gravity of the vehicle and concentration of the mass on the center of gravity of the vehicle body can be implemented. As a result, the traveling performance such as the turning performance of the vehicle or the like can be enhanced.

Further, the light source unit 11 is disposed between the engine 45 and the fuel tank 25. Also by this, concentration of the mass on the center of gravity of the vehicle body can be implemented.

Further, the heat sink 18A (more particularly the plurality of cooling fins 18c) of the light source unit 11 is exposed to the outside from a gap 84 provided between the main frames 32 and the side cover 64 (more particularly the rear side cover 64b). Tip ends of the plurality of cooling fins 18c are positioned in flush with a plane that connects an outer side face of a main frame 32 and an outer side face of a side cover 64, or on the inner side in the vehicle widthwise direction (or on the outer side in the vehicle widthwise direction) with respect to the connection plane.

While the light source unit 11 can be cooled by the heat sink 18A, the cylinder unit 56 disposed around the light source unit 11 or a cooling water pipe extending from the radiator 57 may be connected to the light source unit 11. Consequently, it is possible to cool the light source unit 11 with cooling water cooled by the radiator 57.

The headlamp 71 includes a headlamp light source 86 configured from a bulb or an LED. The headlamp light source 86 is configured from a low beam light source and a high beam light source.

The lighting apparatus 10 described above configures a headlamp apparatus that assists the high beam light source of the headlamp 71, namely, an auxiliary headlamp. It is to be noted that the headlamp light source 86 of the headlamp 71 may configure only a low beam light source. In this case, the lighting apparatus 10 is a headlamp apparatus having a function of the high beam light source of the headlamp 71.

As the motorcycle 20, a naked type motorcycle in which the front fork 26, head pipe 31, main frames 32 and so forth are not covered with a front cowl or side covers from the front or the sides is available. Also in the naked type motorcycle, the light source unit 11 is disposed, for example, between the head pipe 31 and the pivot shaft 27 or disposed between the engine 45 and the fuel tank supported on the main frames 32.

A camera apparatus 91 for picking an image of a situation in front of the vehicle upon traveling at night is provided on the front cowl 62 above the headlamp 71.

The camera apparatus 91 includes a lens, an image pickup element, an image processing unit, a recording unit, a zoom mechanism (including a telescope) and detects visible rays. Upon traveling at night, by recognizing a pedestrian, a leading vehicle or an oncoming vehicle in front of the vehicle picked up by the camera apparatus 91 by an image recognition process by the image processing unit, changeover between a high beam and a low beam of the lighting apparatus 10 and the headlamp 71 can be performed automatically. Consequently, the distance visibility at night by use of the high beam can be enhanced and the burden in beam changeover can be reduced, and dazzling can be prevented by changeover to the low beam.

Further, the distance L1 in the forward and rearward direction between the front light emission unit 12 and the camera apparatus 91 can be secured by a predetermined distance or more, and the influence (interference of heat) of heat generated in the front light emission unit 12 on the camera apparatus 91 can be suppressed.

Figure 2:
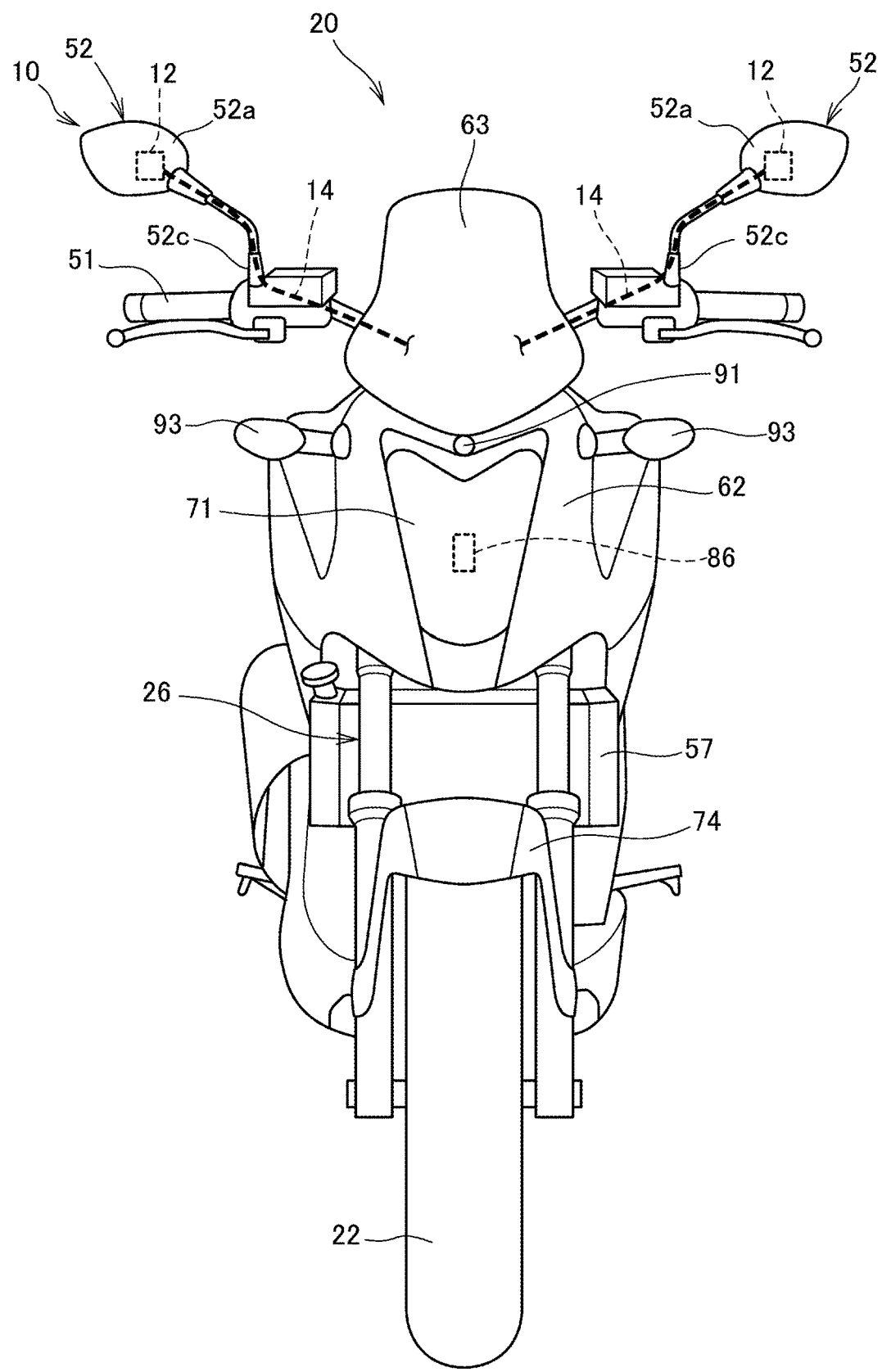
FIG. 2 is a front elevational view (first embodiment) of the motorcycle depicting part of the lighting apparatus.
Figure 3:
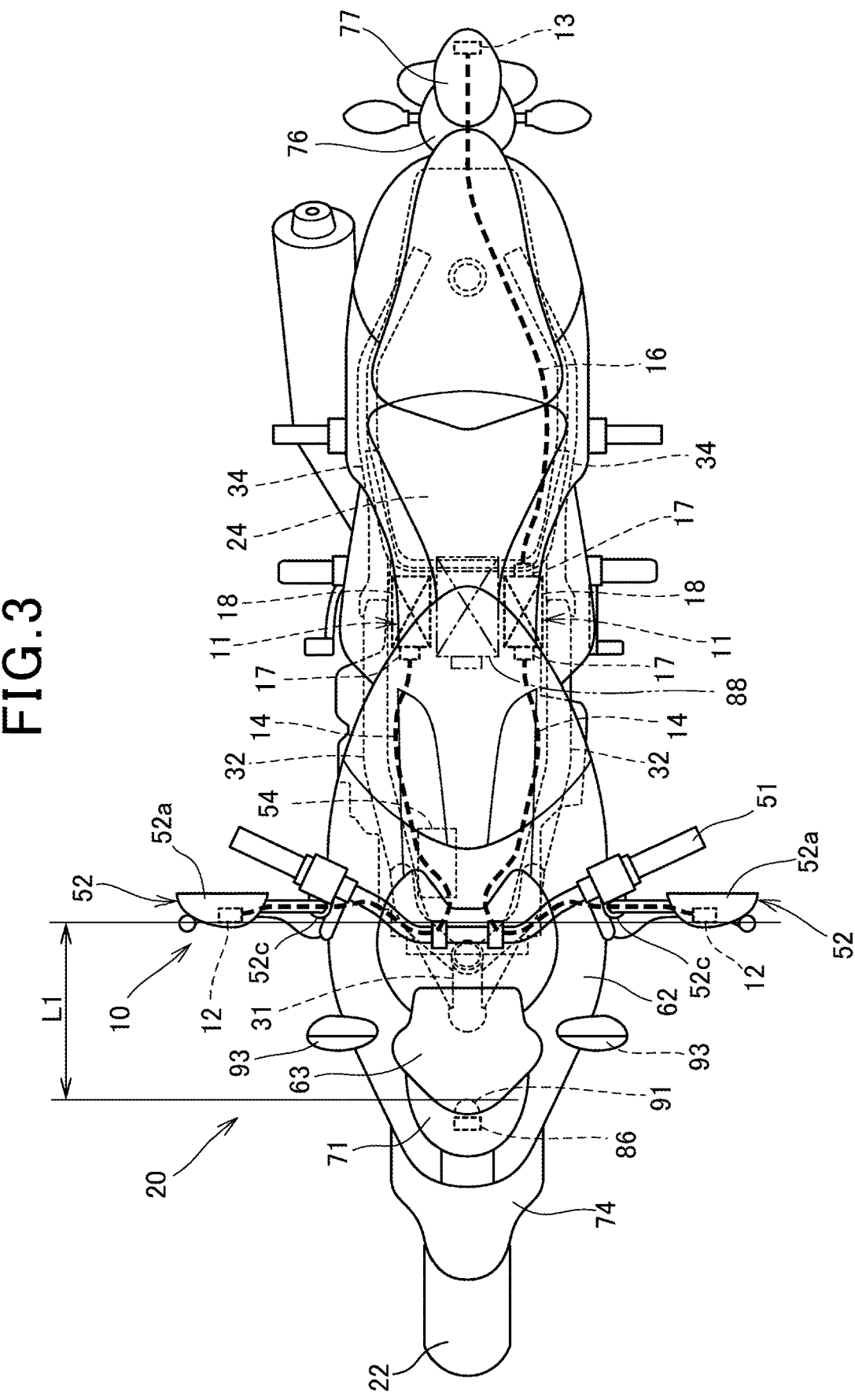
FIG. 3 is a top plan view (first embodiment) of the motorcycle depicting the lighting apparatus.

FIG. 2 is a front elevational view of the motorcycle 20 depicting part of the lighting apparatus 10. FIG. 3 is a top plan view of the motorcycle 20 depicting the lighting apparatus 10.

As depicted in FIGS. 2 and 3 (refer also to FIG. 1), a pair of the left and right light source units 11 are provided on the inner side in the vehicle widthwise direction of the left and right main frames 32. The first light guide members 14 extend from the laser elements 17 toward the front side along an inner side face of the main frames 32 and are curved upwardly in the rear of the head pipe 31. Further, the first light guide members 14 extend to the outer sides in the vehicle widthwise direction from a top bridge 46 (refer to FIG. 1) of the front fork 26 along the handlebar 51, and are curved upwardly from the root of the rear view mirrors 52 and then are coupled to the front light emission units 12 provided on the rear view mirror main bodies 52a.

Since the front light emission units 12 are disposed at a high position of the vehicle as viewed in front elevation of the vehicle, laser light irradiated forwardly of the vehicle from the front light emission units 12 is blocked by nothing and the rear view mirrors 52 are suitable for an installation position of the front light emission units 12.

The second light guide member 16 extends rearwardly along a seat frame 34 on one side (left side) from the laser element 17 of one of the light source units 11, extends rearwardly from a rear end portion of the seat frame 34 along the rear fender 76, and is connected to the rear light emission unit 13 of the tail lamp 77.

While, in the embodiment described above, a pair of left and right light source units 11 are provided, as a modification to the disposition, a single light source unit 88 indicated by an imaginary line may be disposed at a central location in the vehicle widthwise direction between the left and right main frames 32.

Further, while the front light emission units 12 are disposed on the rear view mirror main bodies 52a of the rear view mirror 52, the disposition is not limited to this and the front light emission units 12 may be disposed at root portions 52c positioned at the root of the rear view mirrors 52. The root portions 52c of the rear view mirrors 52 are positioned at a height equal to that of the meter unit 72 (refer to FIG. 1).

Alternatively, the front light emission units 12 may be disposed at a root portion of the window screen 63.

Referring to FIG. 3, between the left and right main frames 32, the battery 54 is disposed at a position rather near to one (more particularly, the right side one) of the main frames 32.

In the front cowl 62, the camera apparatus 91 is disposed above the headlamp 71 but below the window screen 63, and is disposed at a height equal to that of a pair of left and right front indicators 93. By providing the camera apparatus 91 at a comparatively high position of the vehicle body in this manner, an image of a more distant place in front of the vehicle can be picked up and it is made easier to recognize a pedestrian, a leading vehicle and an oncoming vehicle.

As depicted in FIGS. 1 to 3, the lighting apparatus 10 of the motorcycle 20 as a saddle riding vehicle includes the laser element 17, first light guide member 14 and second light guide member 16 as light guide units, front light emission unit 12 and rear light emission unit 13 as light emission units and driver unit 18 as a driving unit.

The laser element 17 emits laser light. The first light guide member 14 and the second light guide member 16 guide light from the laser element 17 to a demanded position. The front light emission unit 12 and the rear light emission unit 13 are provided at a tip end of the first light guide member 14 and the second light guide member 16 and irradiate light of the first light guide member 14 and the second light guide member 16 on the surroundings of the vehicle. The driver unit 18 is provided to drive the laser element 17 to emit light.

The laser element 17 and the driver unit 18 are integrated as the light source unit 11.

The light source unit 11 is disposed between the head pipe 31 having the axial line 31a as a steering axis for the front wheel 22 and the pivot shaft 27 that supports the rear wheel 23 through the swing arm 28 as a rocking member. With the configuration just described, the light source unit 11 can be provided at a position nearer to the center of gravity of the vehicle and concentration of the mass can be achieved. Consequently, the traveling performance of the vehicle can be enhanced.

Further, the light source unit 11 is disposed between the engine 45 as a power source for driving the front wheel 22 or the rear wheel 23 and the fuel tank 25 as an energy source supplying unit for supplying fuel that is an energy source to the engine 45. With the configuration just described, the light source unit 11 can be provided at a position nearer to the center of gravity of the vehicle and concentration of the mass can be achieved. Consequently, the traveling performance of the vehicle can be enhanced.

For example, if the power source is a motor of an electric motorcycle, then the energy source supplying unit for supplying power that is an energy source to the motor is a battery and the light source unit 11 may be disposed between the motor and the battery.

Further, the light source unit 11 is disposed on the inner side of the vehicle body frame 21 (more particularly, a pair of the left and right main frames 32) including the head pipe 31 and the pivot shaft 27. With the configuration just described, the light source unit 11 can be protected from the outer side by the vehicle body frame 21.

Further, part of the light source unit 11 is exposed to the outside. With the configuration just described, the light source unit 11 can be cooled by traveling wind while the light source is protected by the vehicle body frame 21.

Further, a pair of left and right light source units 11 are provided. With the configuration just described, it is made possible to easily secure an amount of light generated by the lighting apparatus 10 and an irradiation range.

Further, the light source unit 11 includes a cooling fin 18c as a fin on a plane that connects a side face of the engine 45 and a side face of the fuel tank 25 or a face offset in the vehicle widthwise direction with respect to the plane. With the configuration just described, the light source unit 11 can be cooled still more by the cooling fin 18c while the light source unit 11 is protected.

Further, the light source unit 11 is cooled by cooling water cooled by the radiator 57. With the configuration, the cooling performance of the light source unit 11 can be enhanced still more.

Further, the lighting apparatus 10 includes the driver unit 18 for driving the laser element (laser light source) 17 to emit light, and the laser element 17 and the driver unit 18 are integrated as the light source unit 11. With the configuration just described, in comparison with an alternative case in which the laser element 17 and the driver unit 18 are provided independently of each other, parts, fastening members and so forth for attaching the components to the vehicle body can be reduced, and the number of members can be reduced and the cost can be suppressed.

Second Embodiment

Figure 4:
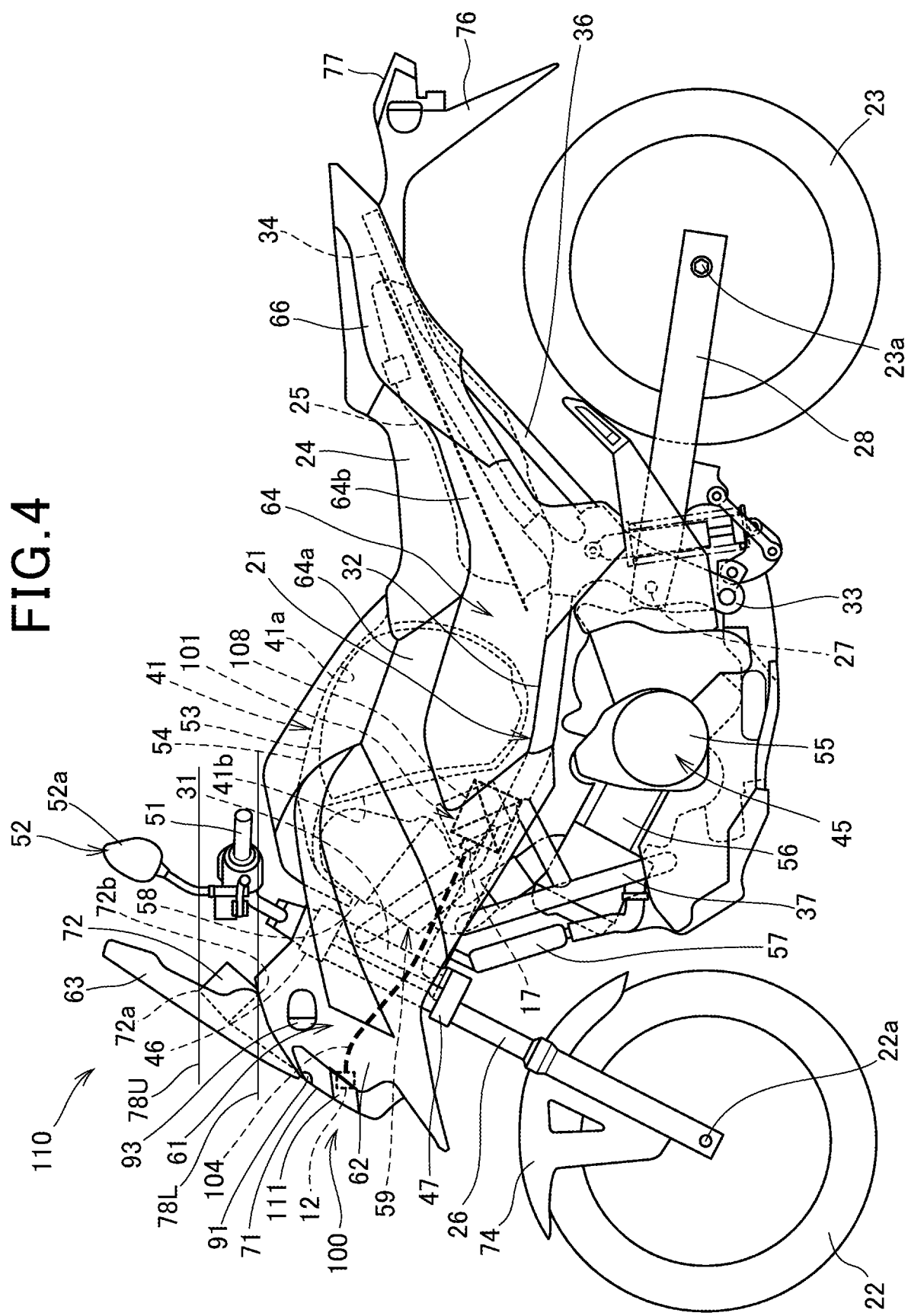
FIG. 4 is a left side elevational view of the motorcycle including a lighting apparatus of a second embodiment according to the present invention.
Figure 5:
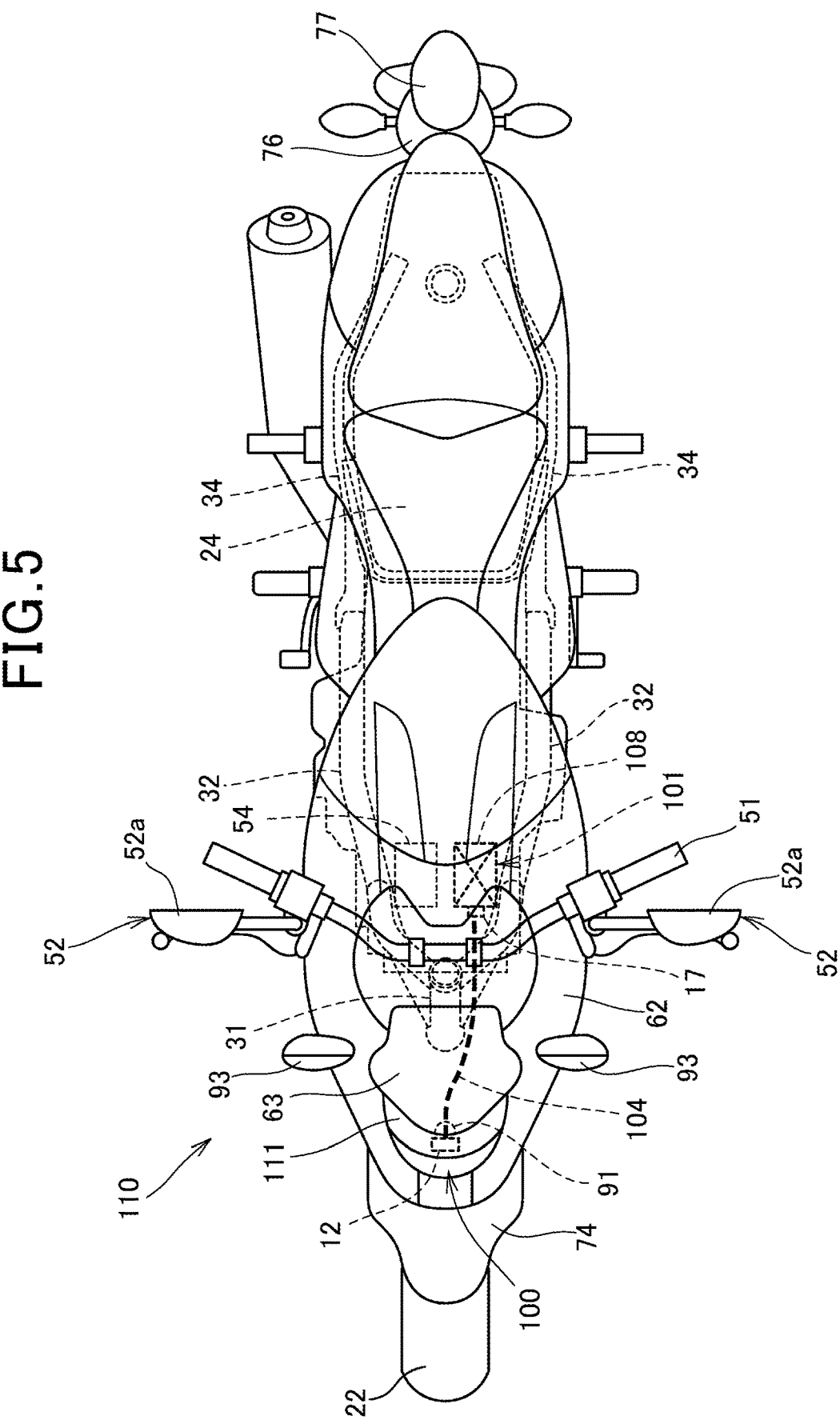
FIG. 5 is a top plan view (second embodiment) of the motorcycle depicting the lighting apparatus.

FIG. 4 is a left side elevational view of a motorcycle 110 including a lighting apparatus 100 of a second embodiment according to the present invention, and FIG. 5 is a top plan view of the motorcycle 110 depicting the lighting apparatus 100.

As depicted in FIGS. 4 and 5, the motorcycle 110 is different only in the lighting apparatus 100 from the lighting apparatus 10 (refer to FIG. 1) of the motorcycle 20 (refer to FIG. 1) of the first embodiment.

The lighting apparatus 100 includes a light source unit 101 disposed between left and right main frames 32 and configuring a headlamp apparatus, a front light emission unit 12 serving as a light source of a headlamp 111 provided in a front cowl 62, and a light guide member 104 that connects the light source unit 101 and the front light emission unit 12 to each other.

The light source unit 101 is configured from a laser element 17 and a driver unit 108 for driving the laser element 17 to emit laser light. The light source unit 101 is disposed at a position between the left and right main frames 32 rather near to the main frame 32 on the other side (particularly, on the left side). Further, the light source unit 101 is disposed sidewardly of a battery 54 in a recessed portion 41b in front of an accommodation chamber 41a of a front accommodation box 41.

The front light emission unit 12 serves, in the headlamp 111, as a high beam light source and configures a headlamp light source together with a low beam light source not depicted provided in the headlamp 111.

The light guide member 104 extends forwardly from the light source unit 101 along one (left side one) of the main frames 32, extends forwardly in the front cowl 62 passing through the side of the head pipe 31 and is connected to the front light emission unit 12 in the headlamp 111.

The front light emission unit 12 described hereinabove may be a headlamp light source configured from the low beam light source and the high beam light source of the headlamp 111. In this case, two light guide members for the low beam light source and the high beam light source may extend from the light source unit 101 to the front light emission unit 12.

The light source unit 101 is disposed between the head pipe 31 and a pivot shaft 27 in the forward and rearward direction of the vehicle. Further, the light source unit 101 is disposed between an engine 45 and the front accommodation box 41.

By disposing the light source unit 101 in the recessed portion 41b at a lower portion of the front accommodation box 41, effective utilization of the vehicle body space can be anticipated and a front portion of the vehicle body can be made small in size and compact.

On the front cowl 62, a camera apparatus 91 is provided above a headlamp 71 but below a windscreen 63. Further, the camera apparatus 91 is disposed at a height same as that of a pair of left and right front indicators 93.

Upon traveling at night, changeover between a high beam and a low beam of the lighting apparatus 100 can be performed automatically by recognizing a pedestrian, a leading vehicle and an oncoming vehicle in front of the vehicle imaged by the camera apparatus 91 through an image recognition process by an image processing unit.

Third Embodiment

Figure 6:
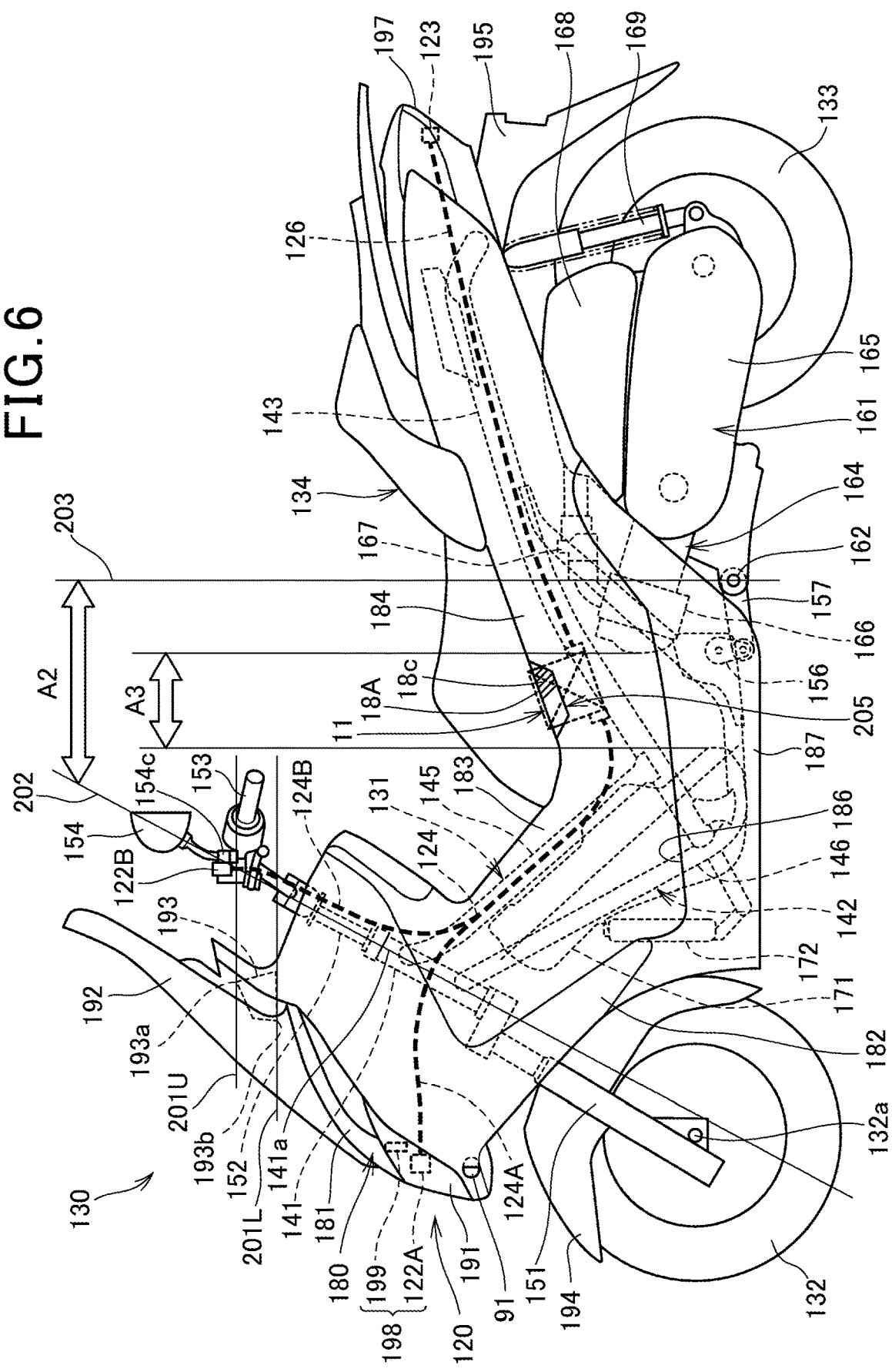
FIG. 6 is a left side elevational view of a motorcycle including a lighting apparatus of a third embodiment according to the present invention.

FIG. 6 is a left side elevational view of a motorcycle 130 that includes a lighting apparatus 120 of a third embodiment according to the present invention.

The motorcycle 130 is a saddle riding vehicle of the scooter type including a vehicle body frame 131, a front wheel 132, a rear wheel 133 and a seat 134.

The vehicle body frame 131 includes a head pipe 141 configuring a front end portion, a down frame 142 extending obliquely downwardly rearwards from the head pipe 141, and a pair of left and right rear frames 143 connected to a lower portion of the down frame 142 and extending obliquely rearwardly upwardly.

The down frame 142 includes a pair of left and right upper down frames 145 extending obliquely downwardly rearwards from an upper portion of the head pipe 141, and a pair of left and right lower down frames 146 extending obliquely downwardly rearwards from a lower portion of the head pipe 141 below the upper down frames 145.

The rear frames 143 are connected at a front end thereof to the lower down frames 146 and connected at an intermediate position thereof to a lower end of the upper down frames 145.

The lower down frames 146 extend rearwardly from below the connection portion to the rear frames 143, are curved obliquely upwardly rearwards and are connected to a rear portion of the rear frame 143.

A front fork 151 is supported for steering operation on the head pipe 141. The front fork 151 includes a steering stem 152 at an upper portion thereof, and the steering stem 152 is inserted for pivotal motion in the head pipe 141. The steering stem 152 has a handlebar 153 attached to an upper end portion thereof, and a pair of left and right rear view mirrors 154 are attached to the handlebar 153.

The front wheel 132 is supported at a lower end portion of the front fork 151 through an axle 132a.

A link member 156 is attached for forward and rearward rocking motion at a lower portion of each lower down frame 146, and a power unit 161 is connected to a lower end portion of the link members 156 through an arm member 157. A pivot shaft 162 is provided on the arm member 157, and the power unit 161 is supported for rocking motion on the pivot shaft 162.

The power unit 161 is configured from an engine 164 that configures a front portion of the power unit 161, and a continuously variable transmission 165 extending rearwardly from one end portion of the engine 164.

The engine 164 includes a cylinder unit 166 extending in the forward and rearward direction, and an intake system 167 is connected to an upper portion of the cylinder unit 166. An air cleaner 168 that configures the intake system 167 is attached to an upper portion of the continuously variable transmission 165. A rear cushion unit 169 serving as a shock absorber extends between a rear end portion of the continuously variable transmission 165 and a rear end portion of the vehicle body frame 131.

A fuel tank 171 is disposed in a forwardly upwardly inclined relationship between the left and right down frames 142. In front of the fuel tank 171, a radiator 172 is disposed and supported on the vehicle body frame 131.

The vehicle body frame 131 is covered with a vehicle body cover 180.

The vehicle body cover 180 includes a front cover 181, a pair of left and right leg shields 182, a center cover 183, a pair of left and right body covers 184, a pair of left and right floor steps 186 and a pair of left and right under covers 187.

The front cover 181 covers the front side of the front fork 151. The leg shields 182 are connected to the opposite side portions of the front cover 181 and cover the leg portions of a rider. The center cover 183 is disposed between the left and right leg shields 182 and covers the rear side of the front fork 151. The body covers 184 extend rearwardly from a rear end of the center cover 183 and cover the opposite sides of the vehicle body. The floor steps 186 extend rearwardly from a lower end of the leg shields 182 and receive the legs of the rider placed thereon. The under covers 187 cover the lower side of the floor steps 186.

The front cover 181 has a headlamp 191 disposed in the inside thereof, and a wind screen 192 is attached to an upper portion of the front cover 181. Further, a meter unit 193 is provided on the front cover 181 behind the wind screen 192.

The front wheel 132 is covered with a front fender 194 from above. The rear wheel 133 is covered with a rear fender 195 from above. A rear combination lamp 197 is disposed above the rear fender 195.

The lighting apparatus 120 includes a light source unit 11, an in-lamp front light emission unit 122A, a front upper light emission unit 122B, a rear light emission unit 123, a first light guide member 124 and a second light guide member 126, and a headlamp 191. The headlamp 191 configures part of the lighting apparatus 120.

The light source unit 11 is disposed on the inner side of the left and right rear frames 143.

The in-lamp front light emission unit 122A serves as a high beam light source of the headlamp 191. The headlamp 191 includes a headlamp light source 198. The headlamp light source 198 is configured from a low beam light source 199 that emits a low beam and the in-lamp front light emission unit 122A that functions as a high beam light source that emits a high beam.

The front upper light emission unit 122B functions as a high beam light source additionally provided in order to assist the in-lamp front light emission unit 122A of the headlamp 191. The front upper light emission unit 122B is provided on the rear view mirror 154, more particularly, at a root portion 154c of each rear view mirror 154. As a result, the front upper light emission unit 122B is disposed at a heightwise position same as that of the meter unit 193 or above the meter unit 193. It is to be noted that, in FIG. 6, in order to facilitate grasping of the heightwise position of the front upper light emission unit 122B, a horizontal imaginary line 201U that passes an upper end 193a of the meter unit 193 and another horizontal auxiliary line 201L that passes a lower end 193b of the meter unit 193 are drawn. The front upper light emission unit 122B is disposed above the lower side auxiliary line 201L and preferably is disposed above the auxiliary line 201U on the upper side. Since the front upper light emission unit 122B is disposed at a high position on the vehicle body as described hereinabove, it is facilitated to secure an irradiation range and an irradiation distance of laser light from the front upper light emission unit 122B.

By providing the in-lamp front light emission unit 122A and the front upper light emission unit 122B disposed at a position higher than the in-lamp front light emission unit 122A as the high beam light source as described above, it is possible to increase the irradiation range, set the irradiation range to a specific direction or to increase the irradiation distance. In this manner, the degree of freedom in irradiation range (including the irradiation direction) and irradiation distance.

The rear light emission unit 123 is disposed in the rear combination lamp 197 and serves as a light source for a brake lamp and a position lamp.

The first light guide member 124 and the second light guide member 126 are formed from an optical fiber and can be curved freely in accordance with the shape of the wiring position in the vehicle body.

The lighting apparatus 120 described above configures a headlamp apparatus that assists the in-lamp front light emission unit 122A of the headlamp 191 with the front upper light emission unit 122B, namely, an auxiliary headlamp.

The first light guide member 124 is configured from a first light guide member 124 connected to the in-lamp front light emission unit 122A, and an upper first light guide member 124B branching from the middle of the first light guide member 124 and connected to the front upper light emission unit 122B.

The light source unit 11 is disposed in a region A2 between the head pipe 141 and the pivot shaft 162 in the forward and rearward direction of the vehicle (particularly between a linear line 202 overlapping with an axial line 141a that passes the center of the head pipe 141 and a vertical line 203 that passes the center of the pivot shaft 162). The light source unit 11 may overlap with the head pipe 141 or the pivot shaft 162 as viewed in side elevation. This makes it possible to dispose the light source unit 11 nearer to the center of gravity of the vehicle and achieve centralization of the mass on the center of gravity of the vehicle body. The axial line 141a of the head pipe 141 serves as a steering axis for the front wheel 132, more particularly, as a steering axis for the front fork 151 on which the front wheel 132 is supported, and the front wheel 132 is steered around the axial line 141a.

Further, the light source unit 11 is disposed in a region A3 between the power unit 161 (more particularly, the engine 45) and the fuel tank 171 in the forward and rearward direction of the vehicle. Also this can achieve centralization of the mass on the center of gravity of the vehicle body.

Further, a heat sink 18A of the light source unit (more particularly, a plurality of cooling fins 18c) is exposed to the outside from a gap 205 provided between the seat 134 and the body covers 184. The plurality of cooling fins 18c are positioned at a tip end thereof in flush with a plane that connects an outer side face of the seat 134 and an outer side face of the body covers 184 to each other or on the inner side in the vehicle widthwise direction (on the outer side in the vehicle widthwise direction) with respect to the connection plane.

Although the light source unit 11 can be cooled by the heat sink 18A, a cooling water pipe extending from the cylinder unit 166 or the radiator 172 disposed around the light source unit 11 may be connected to the light source unit 11. This makes it possible to cool the light source unit 11 with cooling water cooled by the radiator 172.

Some power unit for a scooter type motorcycle is supported for rocking motion on the rear frame 143 of the vehicle body frame 131 through a pivot shaft. In other words, the power unit is supported at an upper portion thereof on the rear frame 143 through a pivot shaft. Also in the case of such a power unit as just described, the light source unit 11 is disposed between the head pipe 141 and the pivot shaft. Alternatively, the light source unit 11 may be disposed otherwise between the power unit and the fuel tank 171.

On the front cover 181 below the headlamp 191, a pair of left and right camera apparatus 91 may be provided.

Figure 7:
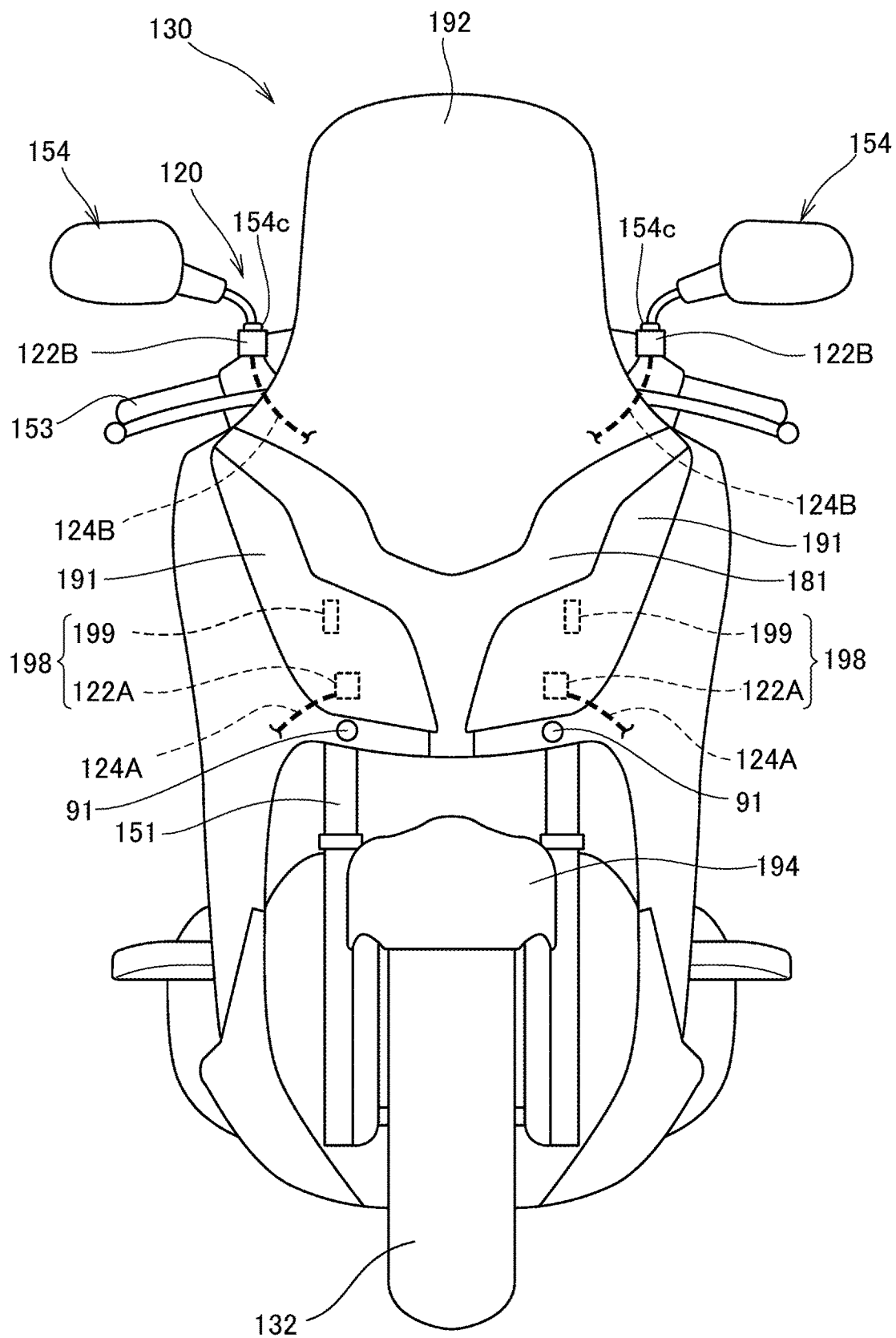
FIG. 7 is a front elevational view (third embodiment) of the motorcycle depicting part of the lighting apparatus.
Figure 8:
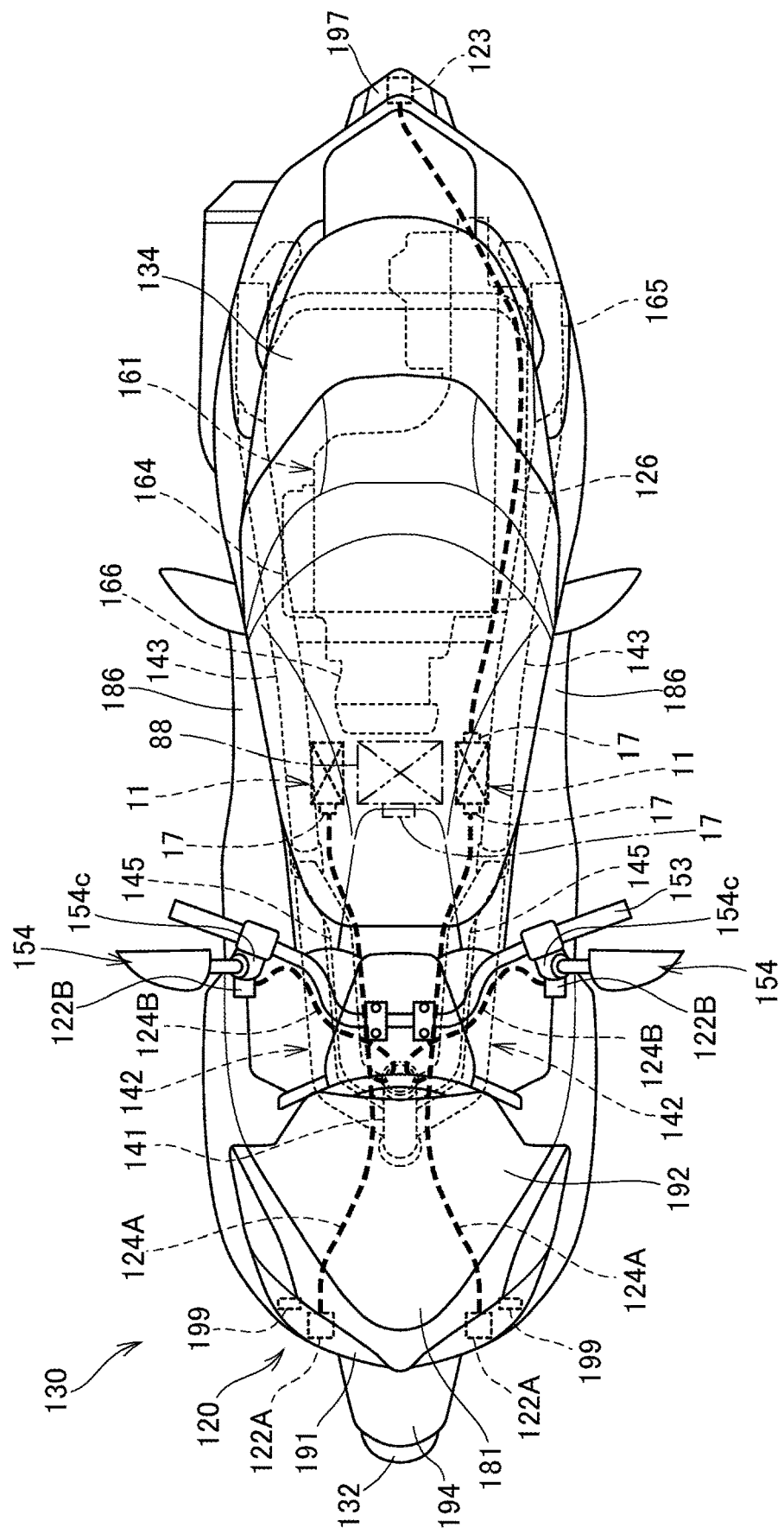
FIG. 8 is a top plan view (third embodiment) of the motorcycle depicting the lighting apparatus.

FIG. 7 is a front elevational view of the motorcycle 130 depicting part of the lighting apparatus 120, and FIG. 8 is a top plan view of the motorcycle 130 depicting the lighting apparatus 120.

As depicting FIGS. 7 and 8 (refer also to FIG. 6), a pair of left and right light source units 11 are provided on the inner side of the left and right rear frames 143 in the vehicle widthwise direction.

First light guide members 124A in pair extend from the laser elements 17 toward the front side along the inner side faces of the down frames 142 (more particularly, the upper down frames 145), extend into the front cover 181 through the sides of the head pipe 141 and are connected to the in-lamp front light emission units 122A in the headlamp 191.

The upper first light guide members 124B are curved upwardly midway of the first light guide members 124A (more particularly, behind the head pipe 141). Further, the upper first light guide members 124B extend upwardly along the steering stem 152 (refer to FIG. 1), further extend to the outer sides in the vehicle widthwise direction along the handlebar 153, and are connected to the front upper light emission units 122B provided at the root portion 154c of the rear view mirror 154.

Since the front upper light emission units 122B are disposed at a high position of the vehicle as viewed in front elevation of the vehicle, nothing interferes with laser light irradiated forwardly of the vehicle from the front upper light emission units 122B, and the rear view mirrors 154 are disposed suitably at positions as disposition positions of the front upper light emission units 122B.

The second light guide member 126 extends rearwardly from the laser element 17 of one of the light source units 11 along the rear frame 143 on one side (left side), extends from a rear end portion of the rear frame 143 into the inside of the rear combination lamp 197 and is connected to the rear light emission unit 123 of the rear combination lamp 197.

While a pair of left and right light source units 11 are provided in the embodiment described above, as a modification to this, a single light source unit 88 indicated by an imaginary line may be disposed at a central location in the vehicle widthwise direction between the left and right rear frames 143.

The left and right camera apparatus 91 are disposed below left and right headlamps 191 on the front cover 181. Where the pair of left and right camera apparatus 91 are provided in this manner, the distance to an image pickup target such as a pedestrian, a leading vehicle, an oncoming vehicle or the like can be determined by the image processing unit provided in the camera apparatus 91. Consequently, the recognition accuracy of the image pickup target can be improved, and changeover between a high beam and a low beam can be performed more rapidly.

It is to be noted that the left and right camera apparatus 91 may be disposed above the headlamps 191 on the front cover 181.

Fourth Embodiment

Figure 9:
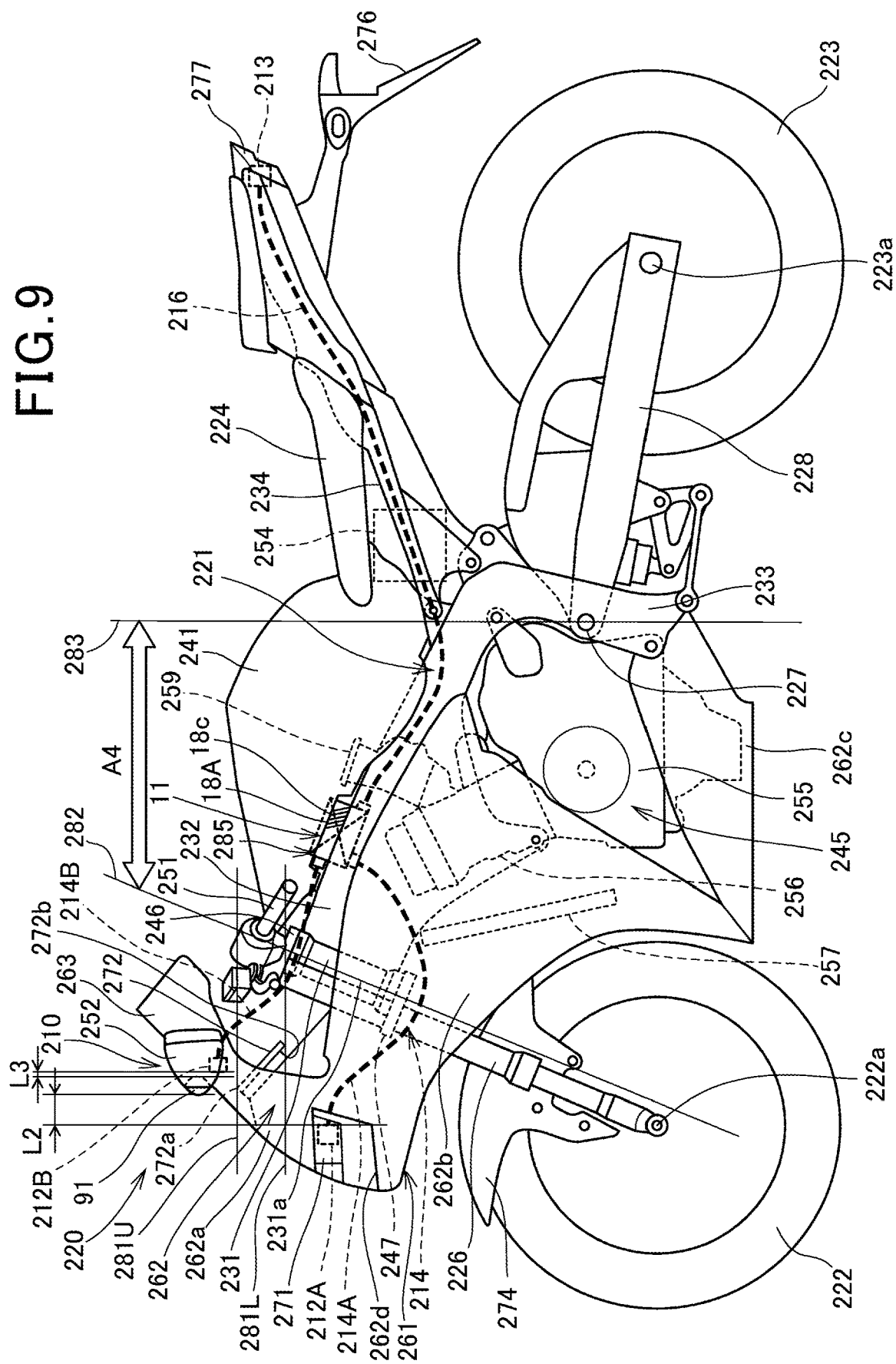
FIG. 9 is a left side elevational view of a motorcycle including a lighting apparatus of a fourth embodiment according to the present invention.

FIG. 9 is a left side elevational view of a motorcycle 220 that includes a lighting apparatus 210 of a fourth embodiment according to the present invention.

The motorcycle 220 is a saddle riding vehicle of the super sport type including a vehicle body frame 221, a front wheel 222, a rear wheel 223 and a seat 224.

The vehicle body frame 221 includes a head pipe 231, a pair of left and right main frames 232, a pair of left and right pivot frames 233, and a pair of left and right seat frames 234.

The head pipe 231 configures a front end portion of the vehicle body frame 221 and supports a front fork 226, which supports the front wheel 222 thereon, for steering operation. The main frames 232 extend obliquely rearwardly downwards from the head pipe 231 and support an engine 245 thereon. A fuel tank 241 is supported at an upper portion of the main frames 232. The pivot frames 233 extend downwardly from a rear end of the main frames 232 and support a pivot shaft 227 extending in the vehicle widthwise direction. Further, the pivot frames 233 cooperate with the main frames 232 to support the engine 245. The seat frames 234 extend obliquely rearwardly upwards from a rear end portion of the main frames 232 and an upper end portion of the pivot frames 233 and support the seat 224 thereon.

The front fork 226 includes a top bridge 246 and a bottom bridge 247 that connect left and right portions thereof to each other. A pair of left and right handlebars 251 are attached to an upper face of the top bridge 246, and the front wheel 222 is supported at a lower end portion of the front fork 226 through an axle 222a.

A swing arm 228 is attached for rocking motion on the pivot shaft 227, and the rear wheel 223 is supported at a rear end portion of the swing arm 228 through an axle 223a.

A battery 254 is disposed below the seat 224 behind the fuel tank 241.

The engine 245 includes a crankcase 255, and a cylinder unit 256 extending obliquely forwardly upwards from a front portion of the crankcase 255. A radiator 257 for water-cooling the engine 245 is disposed in front of the cylinder unit 256. An intake system 259 including an air cleaner and so forth is connected to a rear portion of the cylinder unit 256.

The vehicle body frame 211 is covered with a vehicle body cover 261.

The vehicle body cover 261 includes a cowl 262. The cowl 262 is configured from an upper cowl 262a that covers an upper portion of the head pipe 231 and the front fork 226, a middle cowl 262b that extends from the upper cowl 262a and covers the front fork 226 and the cylinder unit 256 of the engine 245 from the sides, and a lower cowl 262c that covers a lower portion of the engine 245 from the sides.

A headlamp 271 is disposed on the inner side of the upper cowl 262a.

Further, a duct 262d is formed at a central portion in the vehicle widthwise direction of a front face of the upper cowl 262a and takes traveling wind into the upper cowl 262a. The headlamp 271 is provided at an upper edge of the duct 262d. In other words, the headlamp 271 is disposed in the duct 262d.

A wind screen 263 and a pair of left and right rear view mirrors 252 are attached to an upper portion of the upper cowl 262a. A meter unit 272 is disposed at an upper portion of the upper cowl 262a behind the wind screen 263.

The front wheel 222 is covered with a front fender 274 from above. The rear wheel 223 is covered with a rear fender 276 from above. A tail lamp 277 is disposed above the rear fender 276.

The lighting apparatus 210 includes a light source unit 11, an in-lamp front light emission unit 212A, a front upper light emission unit 212B, a rear light emission unit 213, a first light guide member 214 and a second light guide member 216, and the headlamp 271. The headlamp 271 configures part of the lighting apparatus 210.

The light source unit 11 is disposed on the inner side of the left and right main frames 232.

The in-lamp front light emission unit 212A serves as a headlamp light source of the headlamp 271. The headlamp light source is configured from a low beam light source and a high beam light source.

The front upper light emission units 212B are additionally provided in order to assist the in-lamp front light emission units 212A of the headlamp 271 and function as the high beam light sources. The front upper light emission units 212B are provided on the rear view mirrors 252, more particularly, at a root portion 252c (refer to FIG. 10) positioned at a root portion of the rear view mirrors 252. As a result, the front upper light emission units 212B are disposed at a heightwise position same as that of the meter unit 272 or above the meter unit 272. It is to be noted that, in FIG. 9, in order to facilitate grasping of the heightwise position of the front upper light emission units 212B, a horizontal auxiliary line 281U that passes an upper end 272a of the meter unit 272 and another horizontal auxiliary line 281L that passes a lower end 272b of the meter unit 272 are drawn. The front upper light emission unit 212B is disposed above the lower side auxiliary line 281L, preferably, above the upper side auxiliary line 281U. Since the front upper light emission unit 212B is disposed at a high position of the vehicle body as described above, it is facilitated to secure the irradiation range and the irradiation distance of laser light from the front upper light emission unit 212B.

The rear light emission unit 213 is disposed in the tail lamp 277 and serves as a light source for a brake lamp and a position lamp.

The first light guide member 214 and the second light guide member 216 are configured from an optical fiber and can be curved freely in accordance with the shape of the wiring position in the vehicle body.

The first light guide member 214 is configured from a lamp first light guide member 214A connected to the in-lamp front light emission unit 212A and an upper first light guide member 214B connected to the front upper light emission unit 212B.

The light source unit 11 is disposed in a region A4 between the head pipe 231 and the pivot shaft 227 in the forward and rearward direction of the vehicle (more particularly, between a linear line 282 that overlaps with an axial line 231a that passes the center of the head pipe 231 and a vertical line 283 that passes the center of the pivot shaft 227). The light source unit 11 may overlap with the head pipe 231 or the pivot shaft 227 as viewed in side elevation. This makes it possible to position the light source unit 11 nearer to the center of gravity of the vehicle and achieve concentration of the mass to the side of the center of gravity of the vehicle body. The axial line 231a of the head pipe 231 serves as a steering axis for the front wheel 222, more particularly, as a steering axis for the front fork 226 on which the front wheel 222 is supported, and the front wheel 222 is steered around the axial line 231a.

Further, the light source unit 11 is disposed between the engine 245 and the fuel tank 241. Also this can achieve concentration of the mass to the side of the center of gravity of the vehicle body.

The heat sink 18A of the light source unit 11 (more particularly, the plurality of cooling fins 18c) is exposed to the outside through a gap 285 provided between the main frame 232 and the fuel tank 241. The plurality of cooling fins 18c are positioned at a tip end thereof in flush with a plane that connects an outer side face of the main frames 232 and an outer side face of the fuel tank 241 to each other or at the inner side in the vehicle widthwise direction (or at the outer side in the vehicle widthwise direction) with respect to the connection plane.

Although the light source unit 11 can be cooled by the heat sink 18A, a cooling water pipe extending from the cylinder unit 256 or the radiator 257 disposed around the light source unit 11 may be connected to the light source unit 11. This makes it possible for the light source unit 11 to be cooled by cooling water cooled by the radiator 257.

The above-described lighting apparatus 210 is a headlamp apparatus including a headlamp 271 and a front upper light emission unit 212B that assists the high beam light source of the in-lamp front light emission unit 212A that serves as a headlamp light source of the headlamp 271.

A camera apparatus 91 is provided on a front face of each of the left and right rear view mirrors 252.

The distance between the in-lamp front light emission unit 212A and the camera apparatus 91 in the forward and rearward direction is represented by "L2" and the distance between the front upper light emission unit 212B and the camera apparatus 91 in the forward and rearward direction is represented by L3.

Figure 10:
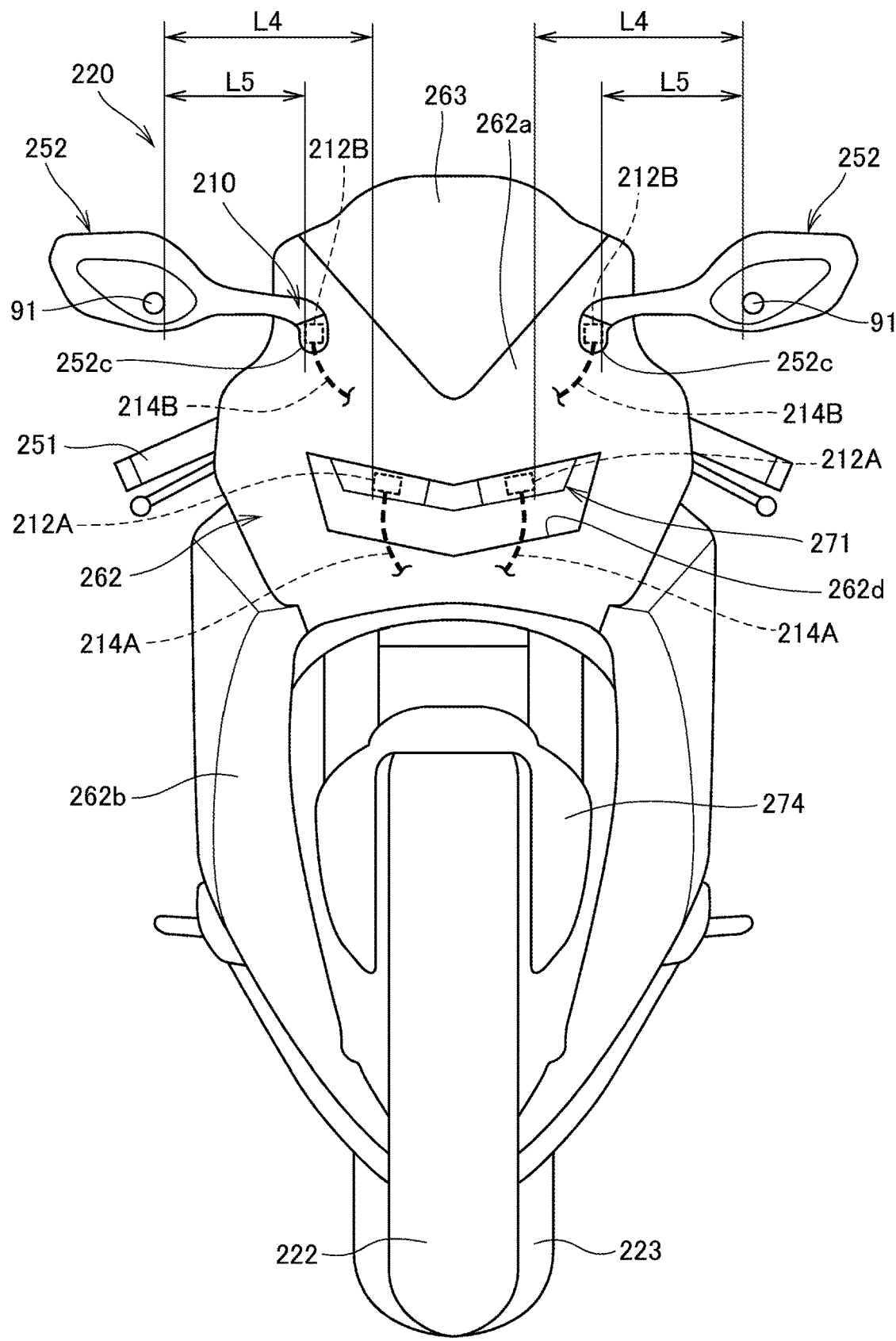
FIG. 10 is a front elevational view (fourth embodiment) of the motorcycle depicting part of the lighting apparatus.
Figure 11:
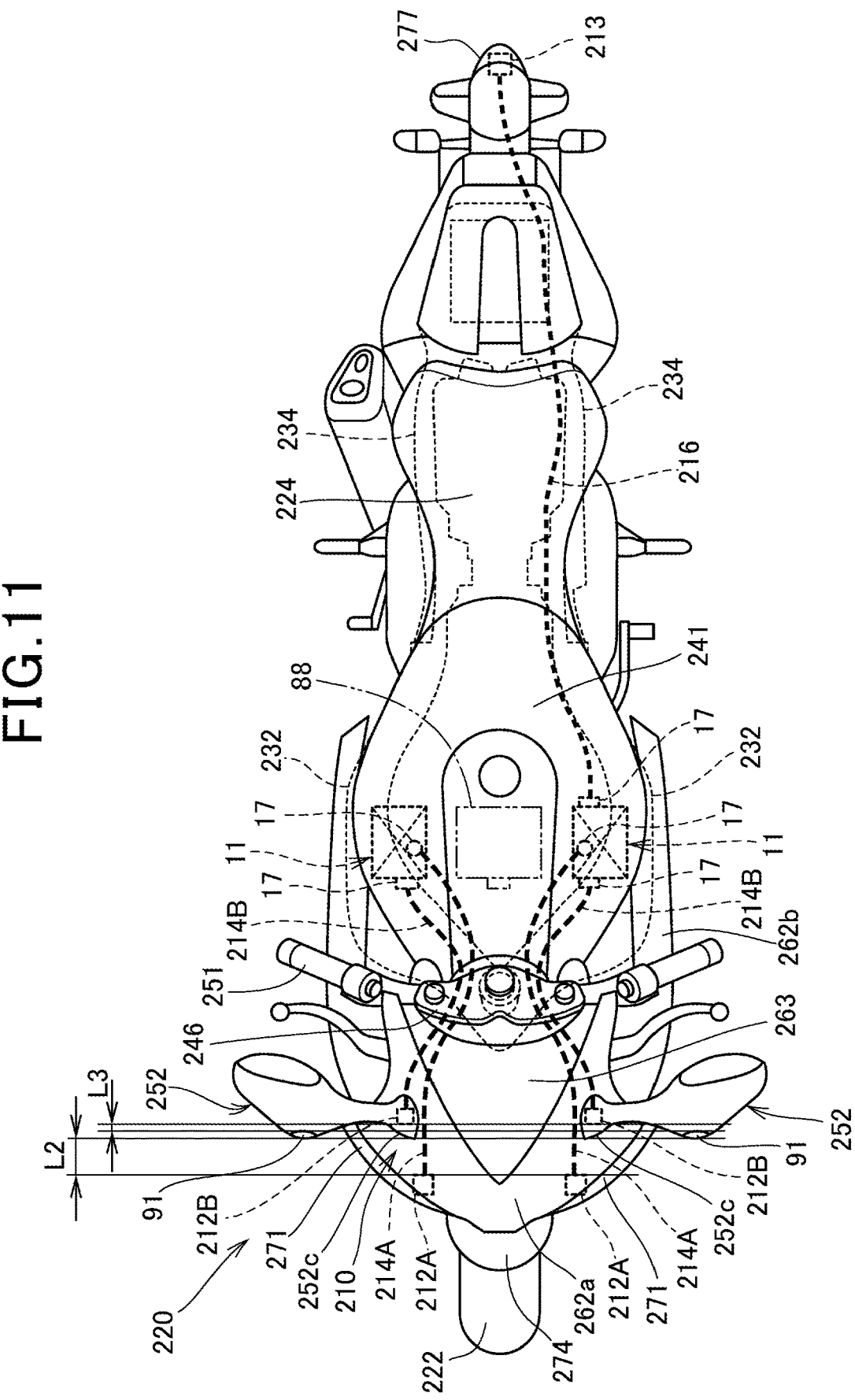
FIG. 11 is a top plan view (fourth embodiment) of the motorcycle depicting the lighting apparatus.

FIG. 10 is a front elevational view of the motorcycle 220 depicting part of the lighting apparatus 210, and FIG. 11 is a top plan view of the motorcycle 220 depicting the lighting apparatus 210.

As depicted in FIG. 10, by incorporating the in-lamp front light emission units 212A of the lighting apparatus 210 into the headlamp 271, the headlamp 271 can made in a so-called "thin eye" shape small in size and small in vertical dimension and can provide a novel impression. Further, by configuring the headlamp 271 in a small size and a small thickness in this manner, the headlamp 271 can be disposed also to a narrow space given by the inside of the duct 262d and the vehicle body space can be utilized effectively. Further, by disposing the in-lamp front light emission unit 212A of the headlamp 271 in the duct 262d, heat generated in the in-lamp front light emission unit 212A can be radiated to traveling wind taken into the duct 262d, and the in-lamp front light emission unit 212A can be cooled.

Referring to FIGS. 10 and 11 (refer also to FIG. 9), a pair of left and right light source units 11 are provided on the inner side in the vehicle widthwise direction of the left and right main frames 232.

The lamp first light guide members 214A extend toward the front side from the laser elements 17 along an inner side face of the main frames 232, extend into the middle cowl 262b and the upper cowl 262a passing below the head pipe 231 (refer to FIG. 9) and are connected to the in-lamp front light emission units 212A in the headlamp 271.

The upper first light guide members 214B extend toward the front side from the laser elements 17 along an upper edge of the main frames 232 and are connected to the front upper light emission units 212B of the root portion 252c of the rear view mirrors 252 from the upper cowl 262a.

Since the front upper light emission units 212B are disposed at a high position of the vehicle as viewed in front elevation of the vehicle, nothing interferes with laser light irradiated forwardly of the vehicle from the front upper light emission units 212B, and the rear view mirrors 252 are disposed suitably at positions as disposition positions of the front upper light emission units 212B.

The second light guide member 216 extends rearwardly from the laser element 17 of one of the light source units 11 along the seat frame 234 on one side (left side), extends from a rear end portion of the seat frame 234 into the inside of the tail lamp 277 and is connected to the rear light emission unit 213 of the tail lamp 277.

Since the left and right camera apparatus 91 are disposed on the outer sides in the vehicle widthwise direction farther than portions of the cowl 262 (more particularly, the middle cowl 262b) that project most to the outer sides in the vehicle widthwise direction, an image of a situation over a wide range forwardly of the vehicle can be picked up and a greater amount of information can be recognized more rapidly.

The distance between the in-lamp front light emission unit 212A and the camera apparatus 91 in the vehicle widthwise direction is represented by "L4" and the distance between the front upper light emission unit 212B and the camera apparatus 91 in the vehicle widthwise direction is represented by L5. As depicted in FIGS. 9 and 10, in the forward and rearward direction, both the distance L2 between the in-lamp front light emission unit 212A and the camera apparatus 91 and the distance L3 between the front upper light emission unit 212B and the camera apparatus 91 are short. However, in the vehicle widthwise direction, both the distance L4 between the in-lamp front light emission unit 212A and the camera apparatus 91 and the distance L5 between the front upper light emission unit 212B and the camera apparatus 91 are equal to or greater than a predetermined distance. Consequently, an influence of heat generated in the in-lamp front light emission unit 212A and the front upper light emission unit 212B on the camera apparatus 91 can be suppressed.

While, in the embodiment described above, a pair of left and right light source units 11 are provided, as a modification to this, a single light source unit 88 indicated by an imaginary line may be disposed at a middle location in the vehicle widthwise direction between the left and right main frames 232.

Fifth Embodiment

Figure 12:
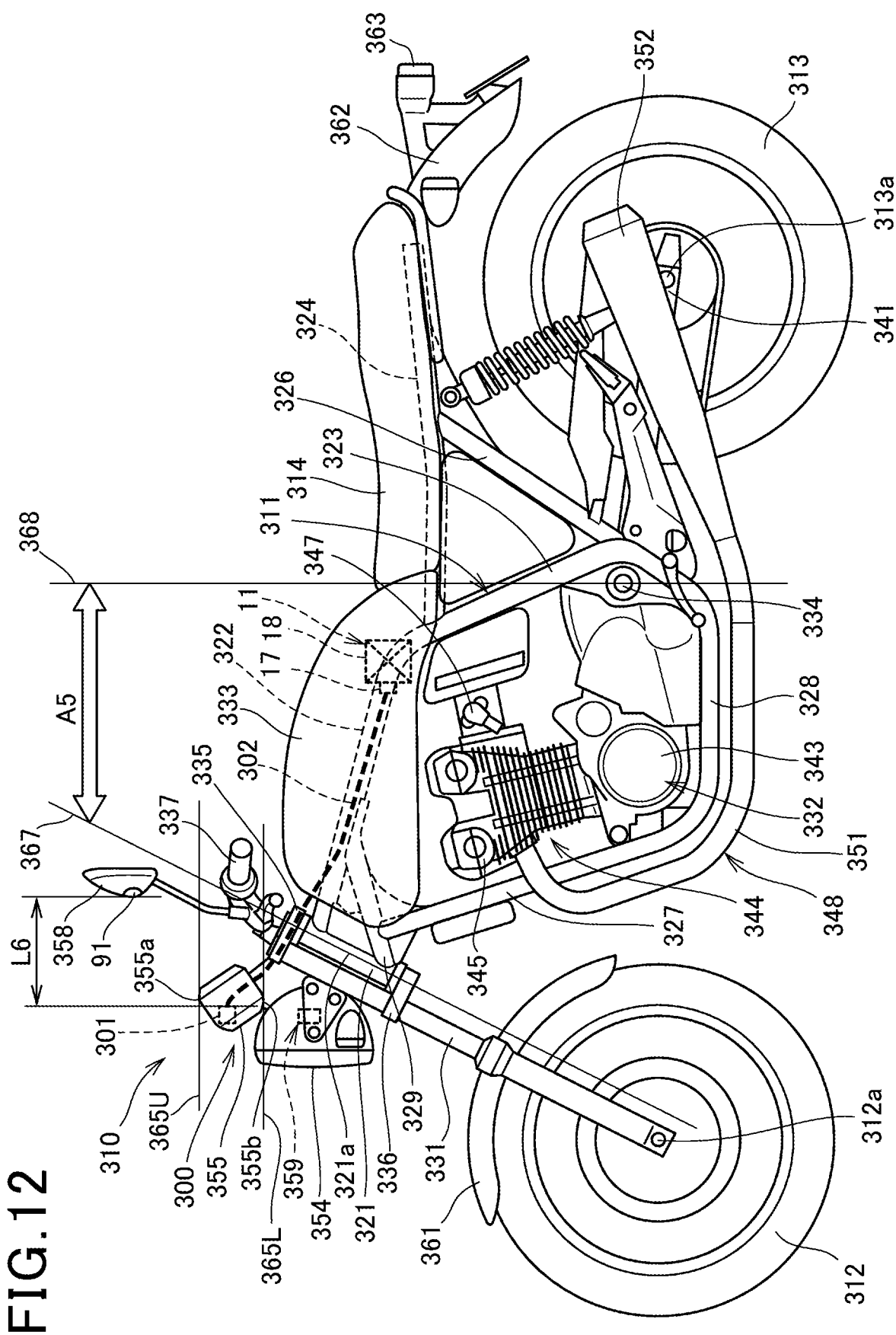
FIG. 12 is a left side elevational view of a motorcycle including a lighting apparatus of a fifth embodiment according to the present invention.
Figure 13:
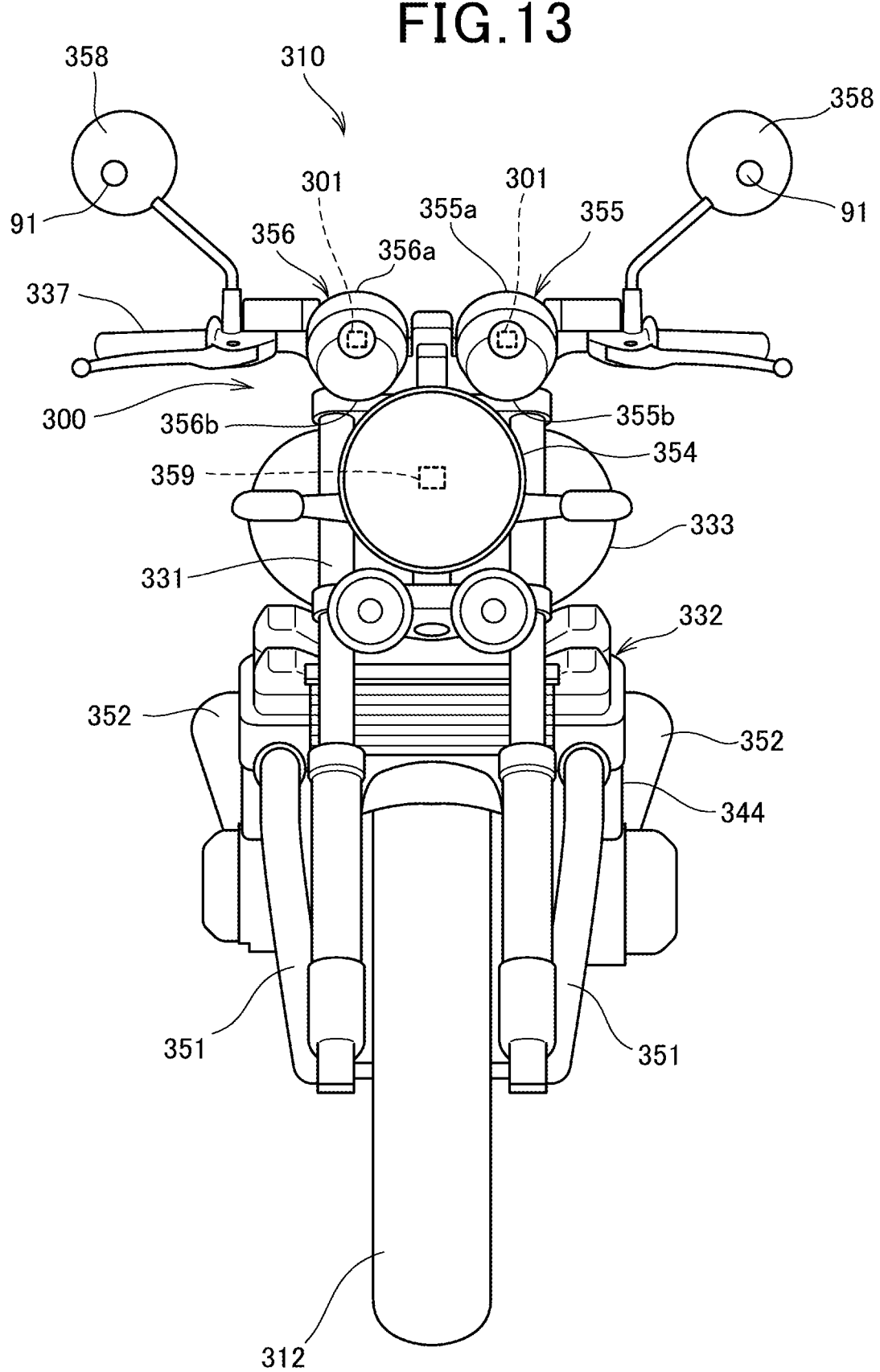
FIG. 13 is a front elevational view (fifth embodiment) of the motorcycle depicting part of the lighting apparatus.

FIG. 12 is a left side elevational view of a motorcycle 310 including a lighting apparatus 300 of a fifth embodiment according to the present invention, and FIG. 13 is a front elevational view of the motorcycle 310 depicting part of the lighting apparatus 300 (fifth embodiment).

As depicted in FIGS. 12 and 13, the motorcycle 310 is a saddle riding vehicle of the naked type including a vehicle body frame 311, a front wheel 312, a rear wheel 313 and a seat 314.

The vehicle body frame 311 includes a head pipe 321, a pair of left and right main frames 322, a pair of left and right pivot frames 323, a pair of left and right seat frames 324, a pair of left and right sub frames 326, a pair of left and right down frames 327, a pair of left and right lower frames 328, and a reinforcement frame 329.

The head pipe 321 configures a front end portion of the vehicle body frame 311 and supports a front fork 331, which supports the front wheel 312, for steering operation. The main frames 322 extend obliquely rearwardly downwards from the head pipe 321 and support an engine 332 thereon. A fuel tank 333 is supported at an upper portion of the main frames 322. The pivot frames 323 extend downwardly from a rear end portion of the main frames 322 and support a pivot shaft 334 extending in the vehicle widthwise direction. The seat frames 324 extend rearwardly from an upper end portion of the pivot frames 323 and support the seat 314 thereon.

The sub frames 326 connect the pivot frames 323 and the seat frames 324 to each other. The down frames 327 extend obliquely rearwardly downwards from a pair of left and right reinforcement frames 329 bridging the head pipe 321 and the left and right main frames 322. Further, the down frames 327 cooperate with the pivot frames 323 to support the engine 332. The lower frames 328 extend rearwardly from a lower end portion of the down frames 327 and are connected at a rear end portion thereof to the pivot frames 323.

The front fork 331 includes a top bridge 335 and a bottom bridge 336 that connect left and right portions thereof to each other. A handlebar 337 is attached to an upper face of the top bridge 335. The front wheel 312 is supported at a lower end portion of the front fork 331 through an axle 312a.

A swing arm 341 is attached for upward and downward rocking motion to the pivot shaft 334, and the rear wheel 313 is supported at a rear end portion of the swing arm 341 through an axle 313a.

The engine 332 includes a crankcase 343 and a cylinder unit 344 extending obliquely forwardly upwards from a front portion of the crankcase 343, and includes a cylinder head 345 on the cylinder unit 344. An intake system 347 including an air cleaner and so forth is connected to a rear portion of the cylinder head 345. An exhaust system 348 is connected to a front portion of the cylinder head 345. The exhaust system 348 is configured from a plurality of exhaust pipes 351 connected to the cylinder head 345, and a muffler 352 connected to a rear end portion of the exhaust pipes 351.

The front fork 331 includes a headlamp 354, and a pair of left and right meter units 355 and 356 disposed above the headlamp 354. A pair of left and right rear view mirrors 358 are attached to the handlebar 337.

The headlamp 354 includes a headlamp light source 359 configured from a bulb or an LED. The headlamp light source 359 includes a low beam light source and a high beam light source.

The front wheel 312 is covered with a front fender 361 from above. The rear wheel 313 is covered with a rear fender 362 from above. A tail lamp 363 is provided at a rear portion of the rear fender 362.

The lighting apparatus 300 includes a pair of left and right light source units 11, a pair of left and right light emission units 301, and a pair of left and right light guide members 302 (only the light guide member 302 on this side is depicted).

The light source units 11 are provided on the inner side in the vehicle widthwise direction of the left and right main frames 322 (only the main frame 322 on this side is depicted) and are located above the intake system 347.

It is to be noted that a pair of left and right light source units 11 may not be provided. For example, a single light source unit 11 may be disposed at a middle location in the vehicle widthwise direction between the left and right main frames 322.

Further, the light source unit 11 is disposed in the vehicle forward and rearward direction in a region A5 between the head pipe 321 and the pivot shaft 334 (more particularly, between a linear line 367 that overlaps with an axial line 321a that passes the center of the head pipe 321 and a vertical line 368 that passes the center of the pivot shaft 334). The light source unit 11 may overlap with the head pipe 321 or the pivot shaft 334 as viewed in side elevation. Consequently, the light source unit 11 can be positioned nearer to the center of gravity of the vehicle, and concentration of the mass upon the side of the center of gravity of the vehicle body can be achieved. The axial line 321a of the head pipe 321 serves as a steering axis for the front wheel 312, more particularly, a steering axis for the front fork 331 on which the front wheel 312 is supported, and the front wheel 312 is steered around the axial line 321a.

The light source unit 11 is disposed between the engine 332 and the fuel tank 333. Also by this, concentration of the mass upon the side of the center of gravity of the vehicle body can be achieved.

Each light emission unit 301 is a high beam light source additionally provided to assist the high beam light source of the headlamp light source 359 of the headlamp 354. The light emission unit 301 is disposed at a front portion of each of the left and right meter units 355 and 356 and is positioned between a horizontal auxiliary line 365U that passes upper ends 355a and 356a of the meter units 355 and 356 and another horizontal auxiliary line 365L that passes lower ends 355b and 356b of the meter units 355 and 356. Since the light emission unit 301 is disposed at a high position of the vehicle body, nothing interferes with laser light irradiated forwardly of the vehicle from the light emission unit 301, and the irradiation range and the irradiation distance for the laser light from the light emission unit 301 can be secured readily. The meter units 355 and 356 are suitable as installation locations for the light emission units 301.

The light guide member 302 can be curved freely in accordance with the shape of the wiring position in the vehicle body. The left and right light guide members 302 extend toward the front side from the laser elements 17 along the inner side faces of the main frames 322 and are curved upwardly behind the head pipe 321. Further, the left and right light guide members 302 extend forwardly from the top bridge 335 of the front fork 331 and are connected to the light emission units 301 of the meter units 355 and 356.

The lighting apparatus 300 described above configures a headlamp apparatus including the light emission unit 301 that assists the high beam light source of the headlamp 354. It is to be noted that the headlamp light source 359 of the headlamp 354 may configure only the low beam light source. In this case, the lighting apparatus 300 is a headlamp apparatus that includes the light emission unit 301 having a function of the high beam light source of the headlamp 354.

A camera apparatus 91 is provided on a front face of each of the left and right rear view mirrors 358.

By providing the camera apparatus 91 on the rear view mirrors 358 at a high position of the vehicle body, the camera apparatus 91 can pick up an image at a farther place in the forward direction of the vehicle and allow a pedestrian, a leading vehicle and an oncoming vehicle to be recognized more readily.

Further, the distance L6 between the light emission unit 301 and the camera apparatus 91 in the forward and rearward direction can be secured with a predetermined distance or more, and an influence of heat generated in the light emission unit 301 upon the camera apparatus 91 can be suppressed.

Figure 14:
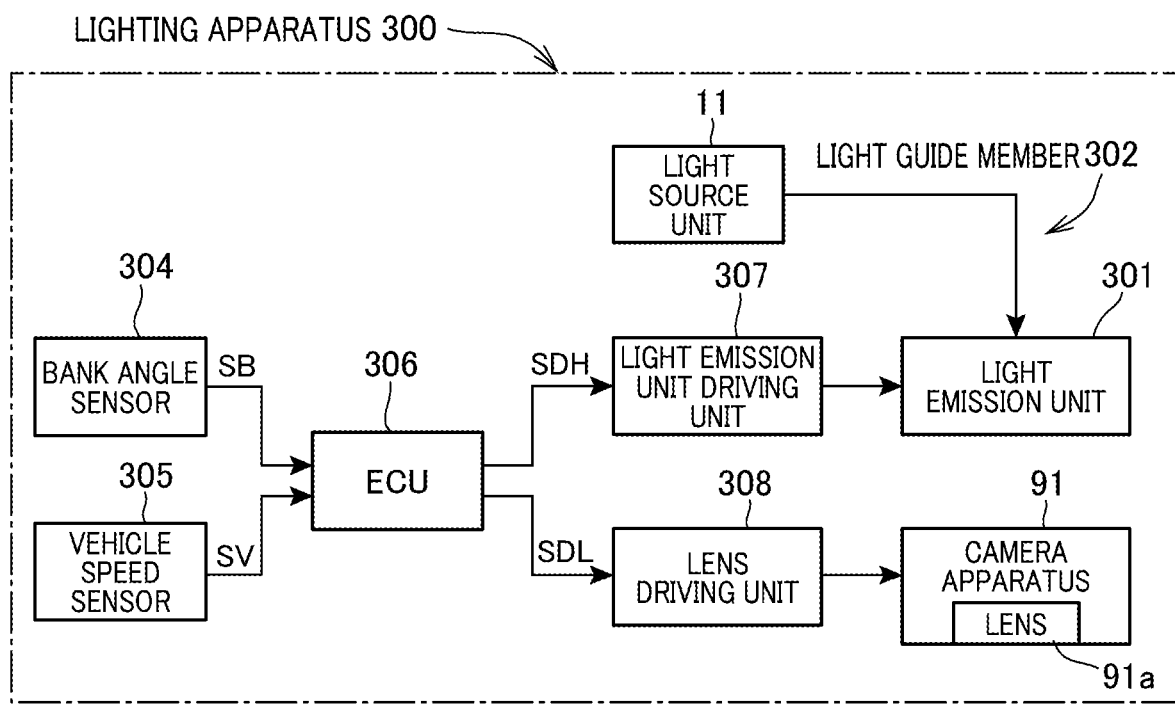
FIG. 14 is a block diagram (fifth embodiment) depicting the lighting apparatus.

FIG. 14 is a block diagram (fifth embodiment) depicting the lighting apparatus 300.

The lighting apparatus 300 can change the irradiation direction of the light emission unit 301 connected to the light source unit 11 through the light guide member 302 to an advancing direction or the like of the vehicle. Further, a lens 91a of the camera apparatus 91 can be directed to an irradiation direction of the light emission unit 301 or the like.

More particularly, the lighting apparatus 300 includes a light source unit 11, a light emission unit 301, a light guide member 302, a bank angle sensor 304, a vehicle speed sensor 305, an ECU (Electronic Control Unit) 306, a light emission unit driving unit 307, a lens driving unit 308 and a camera apparatus 91.

The bank angle sensor 304 detects an inclination angle (bank angle) to the left or the right from an upright state of the vehicle body of the motorcycle 310 (refer to FIG. 13). The vehicle speed sensor 305 detects a vehicle speed of the motorcycle 310. A bank angle signal SB that is a detection signal of the bank angle detected by the bank angle sensor 304 and a vehicle speed signal SV that is a detection signal of the vehicle speed detected by the vehicle speed sensor 305 are outputted to the ECU 306.

The ECU 306 calculates and predicts an advancing direction of the motorcycle 310 on the basis of the bank angle signal SB and the vehicle speed signal SV. Then, the ECU 306 outputs a light emission unit driving signal SDH and a lens driving signal SDL to the light emission unit driving unit 307 and the lens driving unit 308 including the calculated advancing direction, respectively.

The light emission unit driving unit 307 drives the light emission unit 301 by an actuator such as an electric motor, a solenoid, a pneumatic cylinder or a hydraulic cylinder on the basis of the light emission unit driving signal SDH to direct the irradiation direction of the light emission unit 301 to an advancing direction of the motorcycle 310 or to a direction inclined by a predetermined angle with respect to the advancing direction.

The lens driving unit 308 drives the lens 91a provided in the camera apparatus 91 by an actuator such as an electric motor, a solenoid, a pneumatic cylinder or a hydraulic cylinder on the basis of the lens driving signal SDL to direct the orientation direction of the lens to an advancing direction of the motorcycle 310 or to a direction inclined by a predetermined angle with respect to the advancing direction.

It is to be noted that only the lens may not be driven but the camera apparatus 91 including the lens may be entirely driven to direct the image pickup direction of the camera apparatus 91 to an advancing direction of the head pipe 31 or to a direction inclined by a predetermined angle with respect to the advancing direction of the motorcycle 310.

Sixth Embodiment

Figure 15:
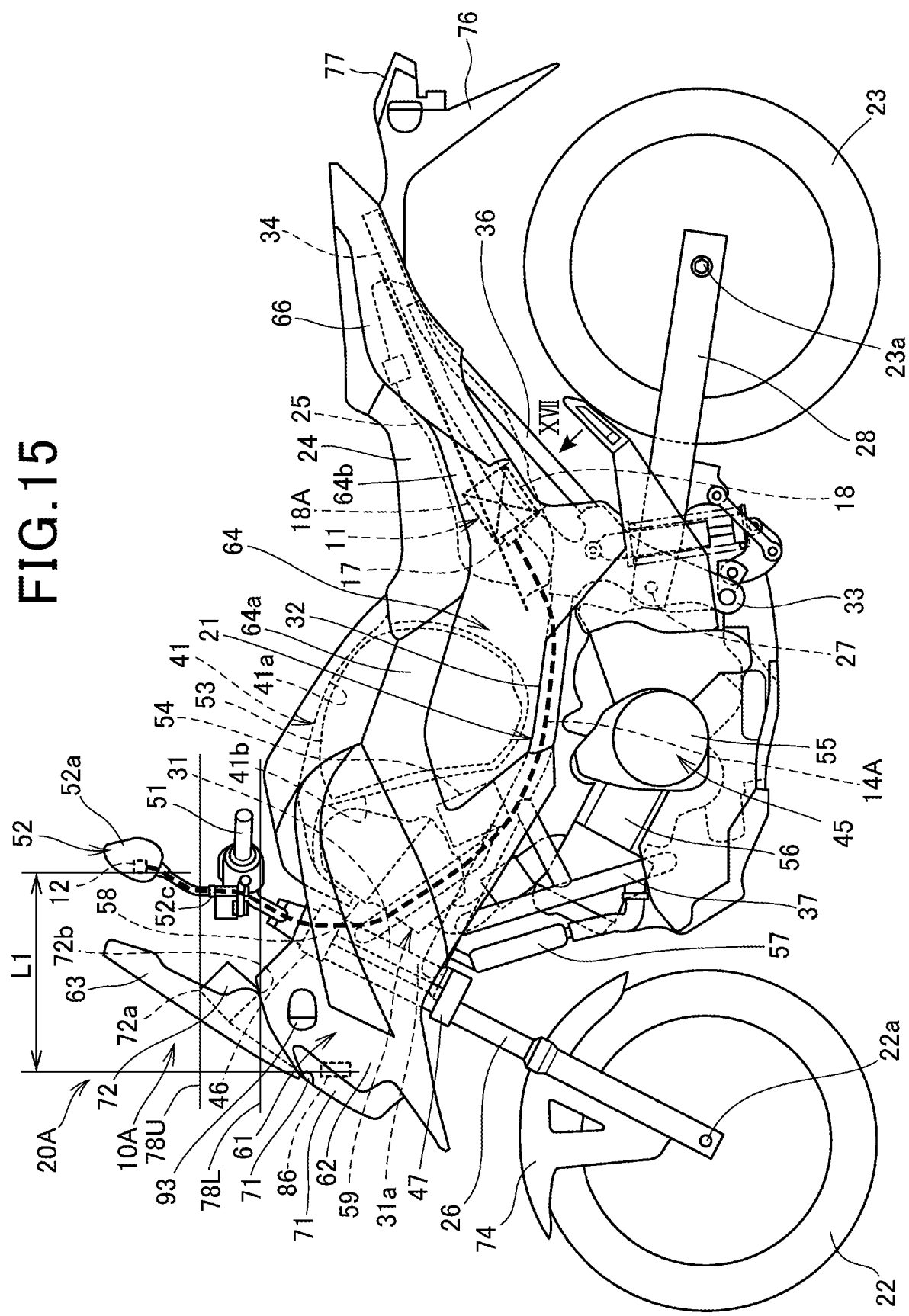
FIG. 15 is a left side elevational view of a motorcycle including a lighting apparatus of a sixth embodiment according to the present invention.

FIG. 15 is a left side elevational view of a motorcycle 20A including a lighting apparatus 10A of a sixth embodiment according to the present invention. In the sixth embodiment, like components to those in the first embodiment are denoted by like reference characters and detailed description of them is omitted.

The motorcycle 20A is a saddle riding vehicle of the multipurpose type including a vehicle body frame 21, a front wheel 22, a rear wheel 23 and a seat 24.

The lighting apparatus 10A includes a light source unit 11, a front light emission unit 12 and a light guide member 14A.

The light source unit 11 is disposed on the inner side of the left and right main frames 32 and is configured from a laser element 17 and a driver unit 18.

The light source unit 11 is attached to left and right seat frames 34 or a rear fender 76 and is, as viewed in side elevation of the vehicle, disposed between the seat 24 and a swing arm 28. The light source unit 11 may overlap with the seat 24 as viewed in side elevation of the vehicle. Further, the light source unit 11 is disposed at a position at which it does not interfere with a fuel tank 25. It is to be noted that the light source unit 11 may be disposed above the rear wheel 23 as viewed in side elevation of the vehicle.

By disposing the light source unit 11 between the seat 24 and the swing arm 28 as described hereinabove, an existing vehicle body space below the seat 24 can be utilized effectively. Further, by disposing the light source unit 11 in the proximity of a pivot plate 33, the light source unit 11 having a comparatively high weight can be positioned closely to the center of gravity of the vehicle body and concentration of the mass on the side of the center of gravity of the vehicle body can be anticipated. As a result, the traveling performance such as the turning performance of the vehicle can be improved.

The light guide member 14A is configured from an optical fiber and guides laser light from the light source unit 11 to the front light emission unit 12, and can be curved freely in accordance with the shape of the wiring position on the vehicle body.

The lighting apparatus 10A described above configures a headlamp apparatus that assists the high beam light source of the headlamp 71, namely, an auxiliary headlamp. It is to be noted that a headlamp light source 86 of the headlamp 71 may otherwise configure only the low beam light source. In this case, the lighting apparatus 10A is a headlamp apparatus having a function of a high beam light source of the headlamp 71.

Also where the motorcycle is of the naked type, the light source unit 11 described above is disposed, for example, between the seat 24 and the swing arm 28 as viewed in side elevation of the vehicle.

As described above, the lighting apparatus 10A of the motorcycle as a saddle riding vehicle includes a laser element 17 as a laser light source, a light guide member 14A as a light guide unit, a front light emission unit 12 as a light emitting unit, and a driver unit 18 as a driving unit.

The laser element 17 emits laser light. The light guide member 14A guides the laser light from the laser element 17 to a desired position. The front light emission unit 12 is provided at a tip end of the light guide member 14A and irradiates the laser light from the light guide member 14A to the surroundings of the vehicle. The driver unit 18 is provided for driving the laser element 17 to emit light.

The laser element 17 and the driver unit 18 are integrated with the light source unit 11, and the light source unit 11 is disposed between the swing arm 28 as a rocking member, which supports the rear wheel 23 for upward and downward rocking motion, and the seat 24 to be seated by an occupant.

According to the configuration described, an existing vehicle body space can be utilized effectively to dispose the light source unit 11, and the lighting apparatus 10 can be disposed readily on the vehicle body.

Upon traveling at night, changeover between a high beam and a low beam of the lighting apparatus 10A and the headlamp 71 can be performed automatically by recognizing a pedestrian, a leading vehicle and an oncoming vehicle in front of the vehicle imaged by the camera apparatus 91 through an image recognition process by an image processing unit. Consequently, it is possible to improve the distance visibility at night by use of a high beam and reduce the beam changeover burden and besides prevent dazzling through changeover to a low beam.

Figure 16:
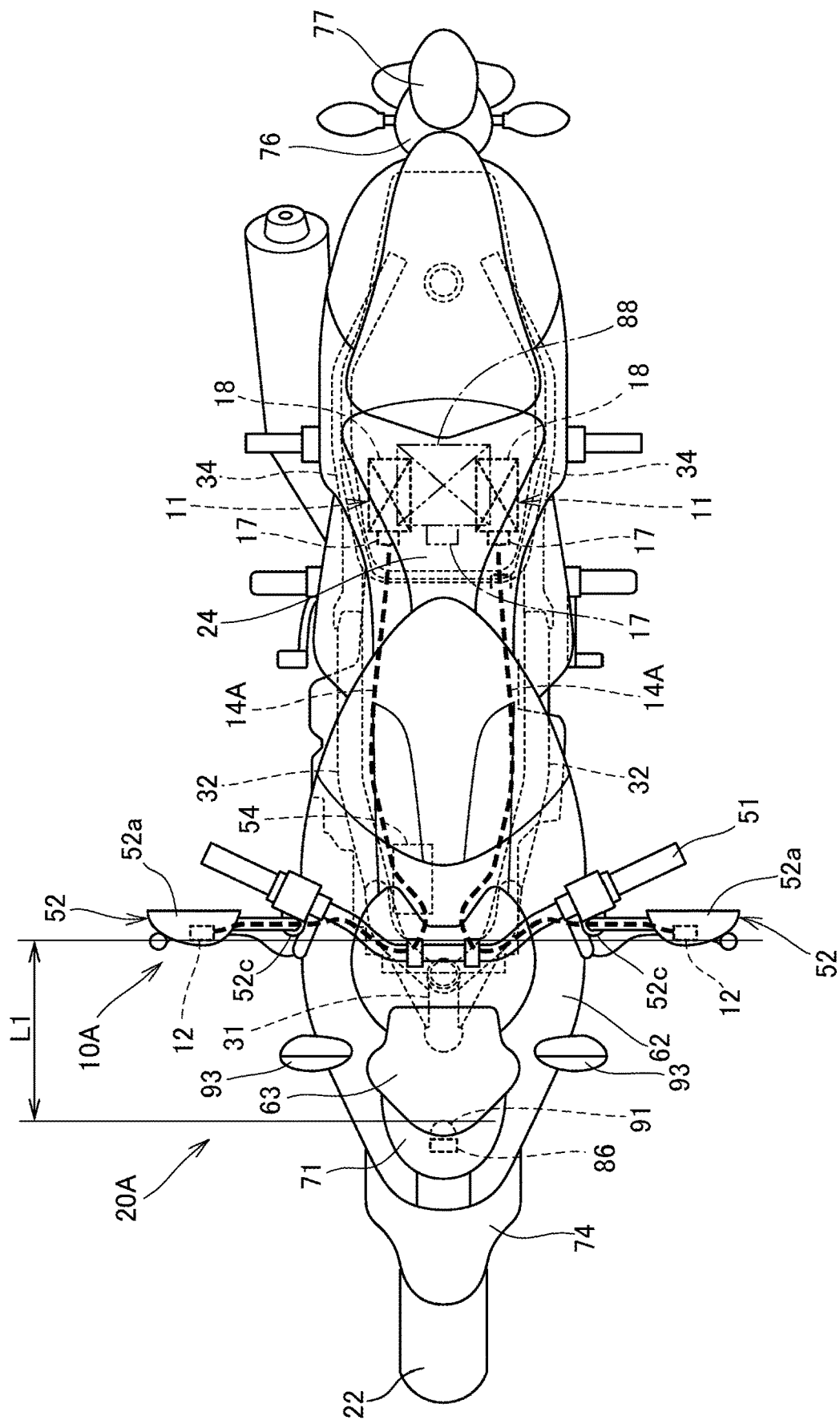
FIG. 16 is a top plan view (sixth embodiment) of the motorcycle depicting the lighting apparatus.

FIG. 16 is a top plan view of the motorcycle 20A depicting the lighting apparatus 10A.

As depicting in FIGS. 2 and 16 (refer also to FIG. 15), a pair of left and right light source units 11 are provided on the inner side in the vehicle widthwise direction of the left and right seat frames 34. The pair of left and right light guide members 14A extend toward the front side from the pair of left and right laser elements 17 along the inner side faces of the left and right seat frames 34 and the left and right main frames 32 and are curved upwardly behind the head pipe 31. Further, the light guide members 14A extend toward the outer sides in the vehicle widthwise direction along a handlebar 51 from a top bridge 46 (refer to FIG. 1) of a front fork 26, are curved upwardly from the root of rear view mirrors 52 and are connected to the front light emission units 12 provided on rear view mirror main bodies 52a.

While, in the embodiment described above, the light source units 11 are provided in left and right pair, as a modification, a single light source unit 88 indicated by an imaginary line may be disposed at a middle location in the vehicle widthwise direction between the left and right seat frames 34.

Further, also the front light emission units 12 are disposed on the rear view mirror main bodies 52a of the rear view mirrors 52, the location of the front light emission units 12 is not limited to this, and the front light emission units 12 may be disposed at the rear view mirrors 52 positioned at the root of the rear view mirrors 52. The root portions 52c of the rear view mirrors 52 are positioned at a height same as that of the meter unit 72 (refer to FIG. 1). By disposing the front light emission units 12 at the root portion 52c of the rear view mirrors 52 in this manner, vibration to be generated in the front light emission units 12 can be suppressed better, and deflection of the laser light to be irradiated can be suppressed.

Since the light source units 11 are disposed on the vehicle body frame 21, more particularly, at the inner side of the left and right seat frames 34 as described above, the light source units 11 are protected and the appearance can be improved further by the left and right seat frames 34.

Further, since the light source units 11 are provided in left and right pair, it is possible to easily secure the light amount and the irradiation range of the lighting apparatus 10A.

Figure 17B:
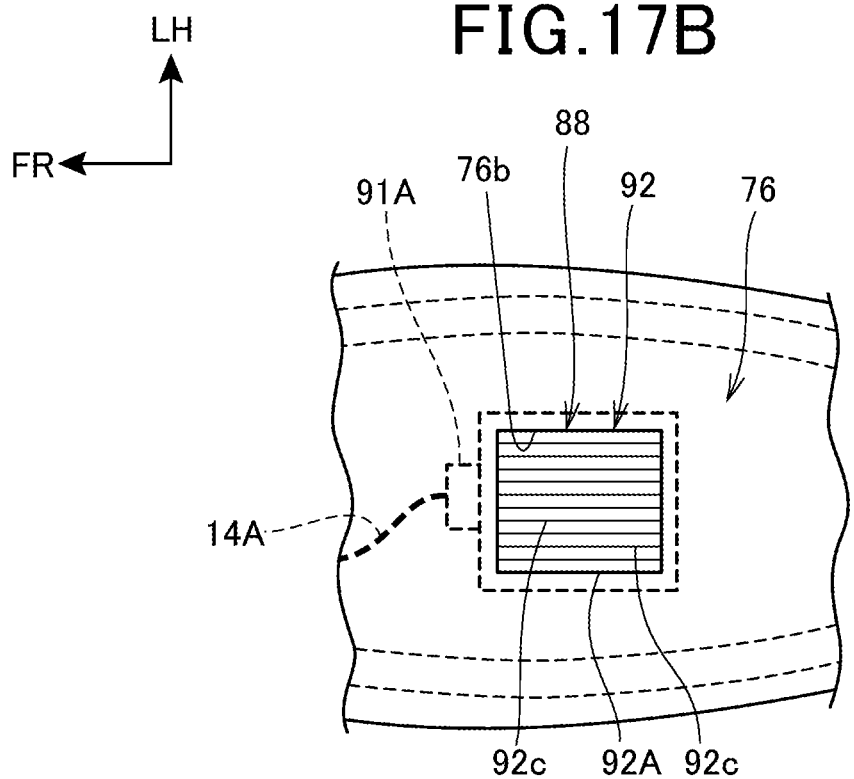

FIGS. 17A and 17B are views of the left and right light source units 11 as viewed from below the rear fender 76. In particular, FIG. 17A is a view as viewed in the direction indicated by an arrow mark XVII of FIG. 15, and FIG. 17B is a view depicting a modification to the light source units 11 of FIG. 17A (view corresponding to a view as viewed indicted by the arrow mark XVII of FIG. 15).

As depicted in FIG. 17A, the rear fender 76 has a pair of left and right openings 76a formed at portions facing the rear wheel 23 (refer to FIG. 15) such that at least part of the light source units 11 are exposed to the outside through the left and right openings 76a.

A plurality of cooling fins 18c are formed on the bottom face of the heat sink 18A of each light source unit 11 such that they extend in the forward and rearward direction.

By exposing the light source units 11 to the outside through the openings 76a of the rear fender 76 in this manner, the cooling fins 18c are hit by traveling wind or an air flow generated by rotation of the rear wheel 23 to urge cooling of the laser element 17 and the driver unit 18 through the heat sink 18A of the light source unit 11.

Since at last part of the light source units 11 are covered with the rear fender 76 as a rear cover provided at a rear portion of the vehicle body as depicted in FIGS. 15, 16 and 17A, the appearance can be improved. Further, since the light source units 11 are covered with a vehicle body cover 61 from the sides, more particularly, with side covers 64, the appearance can be improved furthermore.

Further, since, as depicted in FIGS. 15 and 17A, the rear cover is the rear fender 76 and the light source units 11 are attached to the rear fender 76, the light source units 11 can be supported utilizing existing parts, and there is no necessity to specifically provide a support member for the light source units 11 and the cost can be suppressed.

As depicted in FIG. 17B, an opening 76b is formed at a central portion in the vehicle widthwise direction of the rear fender 76 facing the rear wheel 23 (refer to FIG. 15) such that at least part of the light source unit 88 is exposed to the outside from the opening 76b.

The light source unit 88 is configured from a laser element 91A and a driver unit 92. The driver unit 92 includes a heat sink 92A for cooling the laser element 91A, and the laser element 91A is attached to the heat sink 92A. A plurality of cooling fins 92c are provided on the heat sink 92A so as to extend in the forward and rearward direction, and an effect same as that described hereinabove with reference to FIG. 17A can be obtained by the opening 76b and the cooling fins 92c.

Since part of the light source units 11 and 88 are exposed to the outside facing the rear wheel 23 as depicted in FIGS. 17A and 17B, the light source units 11 and 88 can be hit by traveling wind or an air flow generated by rotation of the rear wheel 23, and consequently, the light source units 11 and 88 can be cooled positively.

Further, since the openings 76a and 76b are provided in the rear fender 76 and the light source units 11 and 88 are exposed to the outside from the openings 76a and 76b, the light source units 11 and 88 can be hit by traveling wind or an air flow generated by rotation of the rear wheel 23 through the openings 76a and 76b, and also upon traveling at a low speed of the motorcycle 20A (refer to FIG. 15), the light source units 11 and 88 can be cooled.

Further, since the openings 76a and 76b of the rear fender 76 are formed open downwardly and the cooling fins 18c and 92c as fins are formed at lower portions of the light source units 11 and 88 that are exposed to the outside, the light source units 11 and 88 can be cooled furthermore by the cooling fins 18c and 92c that are hit by traveling wind or an air flow generated by rotation of the rear wheel 23.

Further, the lighting apparatus 10A includes a driver unit (driving unit) 18 for driving the laser element 17 to emit light and the laser element 17 and the driver unit 18 are integrated as the light source unit 11 as depicted in FIGS. 15 and 16. According to this configuration, the parts, fastening members and so forth for attaching the laser element 17 and the driver unit 18 to the vehicle body can be reduced and the number of parts can be reduced in comparison with those in an alternative case in which the laser element 17 and the driver unit 18 are formed as separate members, and consequently, the cost can be suppressed.

Seventh Embodiment

FIG. 18 is a left side elevational view of a motorcycle 130A including a lighting apparatus 120A of a seventh embodiment according to the present invention. In the seventh embodiment, like elements to those of the third embodiment are denoted by like reference characters, and detailed description of them is omitted.

The motorcycle 130A is a saddle riding vehicle of the scooter type that includes a vehicle body frame 131, a front wheel 132, a rear wheel 133 and a seat 134.

The lighting apparatus 120A includes a light source unit 11, a front upper light emission unit 122B, a light guide member 124C and a headlamp 191.

The light source unit 11 is disposed on the inner side of left and right rear frames 143.

The headlamp 191 includes a headlamp light source 198. The headlamp light source 198 is configured from a low beam light source 199 that emits a low beam and an in-lamp front light emission unit 122A that functions as a high beam light source that emits a high beam.

The light source unit 11 is attached to the left or right rear frame 143 or a rear fender 195 and is disposed between a seat 134 and a power unit 161 as viewed in side elevation of the vehicle. It is to be noted that the light source unit 11 may be disposed above the rear wheel 133 as viewed in side elevation of the vehicle.

While the light source unit 11 can be cooled by a heat sink 18A, a cooling water pipe extending from a cylinder unit 166 or a radiator 172 disposed around the light source unit 11 may be connected to the light source unit 11. This makes it possible to cool the light source unit 11 with cooling water cooled by the radiator 172.

The light guide member 124C is configured from an optical fiber and guides laser light from the light source unit 11 to the in-lamp front light emission unit 122A and the front upper light emission unit 122B, and can be curved freely in accordance with the shape of the wiring position in the vehicle body.

The lighting apparatus 120A described above configures a headlamp apparatus in which the in-lamp front light emission unit 122A of the headlamp 191 is assisted by the front upper light emission unit 122B, namely, an auxiliary headlamp.

The light guide member 124C is configured from a lamp first light guide member 124D connected to the in-lamp front light emission unit 122A, and an upper first light guide member 124B branching from the middle of the lamp first light guide member 124D and connected to the front upper light emission unit 122B.

The power unit 161 for a scooter type motorcycle is sometimes supported for rocking motion on a rear frame 143 of the vehicle body frame 131 through a pivot shaft. In particular, the power unit 161 is supported at an upper portion thereof on the rear frame 143 through a pivot shaft.

Also in the case of such a power unit 161 as just described, the light source unit 11 is disposed between the seat 134 and the power unit 161 as viewed in side elevation of the vehicle.

FIG. 19 is a top plan view of the motorcycle 130A depicting the lighting apparatus 120A.

As depicted in FIGS. 7 and 19 (refer also to FIG. 18), a pair of left and right light source units 11 are provided on the inner side in the vehicle widthwise direction of the left and right rear frames 143.

The lamp first light guide members 124D extend toward the front side from the laser elements 17 along the inner side faces of the rear frames 143 and the down frame 142 (more particularly, the upper down frames 145), extend into the front cover 181 passing along the sides of the head pipe 141 and are connected to the in-lamp front light emission unit 122A in the headlamp 191.

The upper first light guide members 124B are curved upwardly intermediately of the lamp first light guide members 124D (more particularly, behind the head pipe 141). Further, the upper first light guide members 124B extend upwardly along a steering stem 152 (refer to FIG. 1), further extend to the outer sides in the vehicle widthwise direction along the handlebar 153 and are connected to the front upper light emission units 122B provided at the root portions 154c of the rear view mirrors 154.

While, in the present embodiment, the light source units 11 are provided in left and right pair, as a modification, a single light source unit 88 indicated by an imaginary line may be disposed at a central location in the vehicle widthwise direction between the left and right rear frames 143.

Eighth Embodiment

FIG. 20 is a left side elevational view of a motorcycle 220A including a lighting apparatus 210A of an eighth embodiment according to the present invention. In the eighth embodiment, like elements to those of the fourth embodiment are denoted by like reference characters, and detailed description of them is omitted.

The motorcycle 220A is a saddle riding vehicle of the super sport type that includes a vehicle body frame 221, a front wheel 222, a rear wheel 223 and a seat 224.

A vehicle body cover 261A includes a cowl 262A. The cowl 262A is configured from an upper cowl 262e that covers a front portion of a head pipe 231 and a front fork 226, a middle cowl 262b that extends rearwardly from the upper cowl 262e and covering the front fork 226 and a cylinder unit 256 of an engine 245 from the sides, and a lower cowl 262c that covers a lower portion of the engine 245.

A headlamp 271A is disposed on the inner side of the upper cowl 262e. To an upper portion of the upper cowl 262e, a wind screen 263 and a pair of left and right rear view mirrors 252 are attached. A meter unit 272 is disposed at an upper portion of the upper cowl 262e behind the wind screen 263.

The headlamp 271A is disposed on the inner side of the upper cowl 262e.

The lighting apparatus 210A includes a light source unit 11, a front upper light emission unit 212B, and a light guide member 214C.

The light source unit 11 is disposed on the inner side of the left and right seat frames 234.

Further, the light source unit 11 is attached to the left and right seat frames 234 or the rear fender 276 and is disposed between the seat 224 and the swing arm 228 as viewed in side elevation of the vehicle. Further, the light source unit 11 is disposed behind the battery 254.

The headlamp 271A includes a headlamp light source 271*a* configured from a low beam light source and a high beam light source.

The front upper light emission unit 212B is additionally provided in order to assist the high beam light source of the headlamp 271A.

The light guide member 214C is configured from an optical fiber and guides laser light from the light source unit 11 to the front upper light emission unit 212B, and can be curved freely in accordance with the shape of the wiring position in the vehicle body.

The lighting apparatus 210A described above configures a headlamp apparatus that assists the high beam light source of the headlamp 271A, namely, an auxiliary headlamp. It is to be noted that the headlamp light source 271*a* of the headlamp 271A may configure only the low beam light source. In this case, the lighting apparatus 210A is a headlamp apparatus that has a function of the high beam light source of the headlamp 271A.

Since the battery 254 is disposed below the seat 224 and the light source unit 11 is disposed behind the battery 254, the length of a wire harness for connecting the battery 254 and the light source unit 11 to each other can be reduced, and the cost and the weight can be reduced. Further, since routing of the wire harness can be performed readily, the man-hours of assembly can be reduced and the assembling property can be improved. Further, since the battery 254 and the light source unit 11 are disposed in a concentrated manner below the seat 224, concentration of the mass upon the location in the proximity of the center of gravity of the vehicle body can be achieved and the traveling performance of the motorcycle 220 can be improved.

FIG. 21 is a front elevational view of the motorcycle 220A depicting part of the lighting apparatus 210A, and FIG. 22 is a top plan view of the motorcycle 220A depicting the lighting apparatus 210A.

As depicted in FIGS. 21 and 22 (refer also to FIG. 20), a pair of left and right light source units 11 are provided on the inner side in the vehicle widthwise direction of the left and right seat frames 234.

The left and right light guide members 214C extend toward the front side from the left and right laser elements 17 along inner edges of the left and right seat frames 234 and the left and right main frames 232, and are connected to the front upper light emission units 212B of the root portion 252*c* of the rear view mirrors 252 from the upper cowl 262*e*.

While, in the embodiment described above, a pair of left and right light source units 11 are provided, as a modification to this, a single light source unit 88 indicated by an imaginary line may be disposed at a middle location in the vehicle widthwise direction between the left and right seat frames 234.

Ninth Embodiment

FIG. 23 is a left side elevational view of a motorcycle 310A that includes a lighting apparatus 300A of a ninth embodiment according to the present invention. In the ninth embodiment, like components to those in the first embodiment are denoted by like reference characters and detailed description of them is omitted.

The motorcycle 310A is a saddle riding vehicle of the super sport type including a vehicle body frame 221, front wheel 222, rear wheel 223 and a seat 224.

The motorcycle 310 includes a lighting apparatus 300A.

The lighting apparatus 300A is a headlamp apparatus that includes a light source unit 11A, a light guide member 304J and a headlamp 311A.

The light source unit 11A is disposed on the inner side of the left and right seat frames 234.

Further, the light source unit 11A is attached to the left and right seat frames 234 or a rear fender 276 and is disposed between the seat 224 and a swing arm 228 as viewed in side elevation of the vehicle. Further, the light source unit 11A is disposed above the rear wheel 223 as viewed in side elevation of the vehicle.

The headlamp 311A includes, as a light source thereof, an in-lamp first light emission unit 302A that serves as a low beam light source for emitting a low beam of laser light and an in-lamp second light emission unit 302B that serves as a high beam light source for emitting a high beam of laser light.

The light guide member 304J is configured from an optical fiber and guides laser light from the light source unit 11A to the in-lamp first light emission unit 302A and the in-lamp second light emission unit 302B, and can be curved freely in accordance with the shape of the wiring position in the vehicle body.

The distance between the in-lamp first light emission unit 302A and the camera apparatus 91 in the forward and rearward direction is represented by L7, and the distance between the in-lamp second light emission unit 302B and the camera apparatus 91 in the forward and rearward direction is represented by L8.

FIG. 24 is a top plan view of the motorcycle 310A depicting the lighting apparatus 300A.

As depicted in FIG. 24 (refer also to FIG. 23), the light source unit 11A is configured from a light source unit 11L disposed on one side (left side) in the vehicle widthwise direction, and a light source unit 11R disposed on the other side (right side) in the vehicle widthwise direction. The light source units 11L and 11R are disposed on the inner side in the vehicle widthwise direction of the left and right seat frames 234. The light source unit 11L is configured from a laser element 17L and a driver unit 18L and emits laser light service as a low beam light source. The light source unit 11R is configured from a laser element 17R and a driver unit 18R and emits laser light serving as a high beam light source.

The light guide member 304J is configured from a lamp first light guide member 304A connected to the left and right in-lamp first light emission units 302A, and a lamp second light guide member 304B connected to the left and right in-lamp second light emission units 302B.

The lamp first light guide member 304A is configured from a first main light guide member 304C provided on the laser element 17L side, and first sub light guide members 304D and 304E branching leftwardly and rightwardly from the first main light guide member 304C.

The lamp second light guide member 304B is configured from a first main light guide member 304F provided on the laser element 17R side, and first sub light guide members 304G and 304H branching leftwardly and rightwardly from the first main light guide member 304F.

The first main light guide member 304C of the lamp first light guide member 304A extends toward the front side from the laser element 17L along the inner side faces of the seat frames 234 on one side (left side) and the main frames 232 on the one side (left side). The first main light guide member 304C branches to the first sub light guide members 304D and 304E behind the head pipe 231 (refer to FIG. 11). The first sub light guide members 304D and 304E extend into the middle cowl 262*b* and the upper cowl 262*e* passing below the head pipe 231 and are connected to the in-lamp first light emission units 302A in the headlamp 311A.

Meanwhile, the first main light guide member 304F of the lamp second light guide member 304B extends toward the front side from the laser element 17R along the inner side faces of the seat frames 234 on the other side (right side) and the main frames 232 on the other side (right side). Further, the first main light guide member 304F branches to the first sub light guide members 304G and 304H below the head pipe 231 (refer to FIG. 11). The first sub light guide members 304G and 304H extend into the middle cowl 262b and the upper cowl 262e passing below the head pipe 231 and is connected to the in-lamp second light emission units 302B in the headlamp 311A.

Although, in the embodiment described above, the light source units 11L and 11R are provided in left and right pair, as a modification to this, a single light source unit 88 indicated by an imaginary line may be disposed at a middle location in the vehicle widthwise direction between the left and right seat frames 234.

Both the distance L7 between the in-lamp first light emission unit 302A and the camera apparatus 91 in the forward and rearward direction and the distance L8 between the in-lamp second light emission unit 302B and the camera apparatus 91 are smaller than a predetermined distance. However, in the front elevation of the vehicle similar that depicted in FIG. 21, the headlamp 311A and the left and right camera apparatus 91 are spaced much from each other, and the distances between the in-lamp first light emission unit 302A and the camera apparatus 91 and between the in-lamp second light emission unit 302B and the camera apparatus 91 are greater than the predetermined distance. This can suppress the influence of heat generated in the in-lamp first light emission unit 302A and the in-lamp second light emission unit 302B upon the camera apparatus 91.

The embodiments described above indicate a mode of the present invention to the end and can be arbitrarily modified and applied without departing from the subject matter of the present invention.

For example, although the laser element and the driver unit are integrated as a light source unit, the configuration of the light source unit is not limited to this, and the laser element and the driver unit may be formed as separate members and disposed at different places from each other.

Further, while, in the sixth to ninth embodiments described above, the light source unit is disposed between a rocking member that supports the rear wheel for upward and downward movement and a seat to be seated by an occupant as viewed in side elevation of the vehicle, the disposition of the light source unit is not limited to this, and the light source unit may be disposed above the front wheel or in front of both the front fork and the handlebar as viewed in side elevation of the vehicle. In this instance, the light source unit may overlap with the front fork and the handlebar as viewed in side elevation of the vehicle. In this case, the light source unit may further be attached to a cover member that covers the front fork, the handlebar or the head pipe directly or indirectly through a stay or the like.

The present invention can be applied not only to a motorcycle but also to a saddle riding vehicle including various vehicles other than the motorcycle. It is to be noted that the saddle riding vehicle includes vehicles in general that a rider straddles on the vehicle body and includes not only motorcycles (including motorized vehicles) but also three-wheeled vehicles and four-wheeled vehicles classified as ADVs (rough terrain vehicles).

DESCRIPTION OF REFERENCE SYMBOLS 10, 10A, 100, 120, 120A, 210, 210A, 300A: Lighting apparatus
11, 11L, 11R, 88, 101: Light source unit
12: Front light emission unit (light emission unit)
13: Rear light emission unit (light emission unit)
14: First light guide member (light guide unit)
14A, 124C, 214C, 304J: Light guide member (light guide unit)
16, 126, 216: Second light guide member (light guide unit)
17, 17L, 17R, 91A: Laser element (laser light source)
18, 18L, 18R, 92, 108: Driver unit (driving unit)
18c, 92c: Cooling fin (fin)
20, 20A, 110, 130, 130A, 220, 220A, 310, 310A: Motorcycle (saddle riding vehicle)
21, 131, 221: Vehicle body frame
22, 132, 222: Front wheel
23, 133, 223: Rear wheel
24, 134, 224: Seat
25, 171, 241, 333: Fuel tank (energy source supplying unit)
27, 162, 227: Pivot shaft
28, 228: Swing arm (rocking member)
31, 141, 231: Head pipe
31a, 141a, 231a: Axial line (steering axis for front wheel)
34: Seat frame (vehicle body frame)
45, 164, 245: Engine (power source)
57, 172, 257: Radiator
76, 195, 276: Rear fender (vehicle body cover)
76a, 76b: Opening
104: Light guide member (light guide unit)
122A, 212A: In-lamp front light emission unit (light emission unit)
122B, 212B: Front upper light emission unit (light emission unit)
123, 213: Rear light emission unit (light emission unit)
143: Rear frame (vehicle body frame)
152: Steering stem (steering axis)
161: Power unit (rocking member)
212A: In-lamp front light emission unit (light emission unit)
212B: Front upper light emission unit (light emission unit)
234: Seat frame (vehicle body frame)
254: Battery
302A: In-lamp first light emission unit (light emission unit)
302B: In-lamp second light emission unit (light emission unit)

The invention claimed is:

1. A saddle riding vehicle, comprising:
a vehicle body frame including a head pipe defining a steering axis for a front wheel, a pivot shaft supporting a rear wheel through a rocking member, left and right main frame members, left and right pivot frames for supporting the pivot shaft, and left and right seat frames;
a vehicle body cover at least partially covering the vehicle body frame;
a light source unit including a laser light source, a heat sink thermally coupled to the laser tight source for dissipating heat generated by the light source unit, and a plurality of cooling fins extending from: the heat sink and cooled by air flowing through a gap provided between the vehicle body frame and the vehicle body cover, the light source unit being disposed between the head pipe and the pivot shaft, and between the left and right main frame members;
a light guide unit including at least a first light guide member with a first input end optically coupled to the light source unit and extending forwardly from the light source unit along an inner side face of one of the left and right main frame members to a first output end at a front side of the saddle riding vehicle, and a second light guide member with a second input end optically coupled to the light source unit and extending rearwardly from the light source unit along an inner side face of one of the left and right seat frames to a second output end at a rear side of the saddle riding vehicle; and at least two light emission units, each coupled to the first and second output ends of a respective one of the first and second light guide members.

2. The saddle riding vehicle according to claim 1, wherein the light source unit is disposed between a power source configured to drive the front wheel or the rear wheel and an energy source supplying unit configured to supply an energy source to the power source.

3. The saddle riding vehicle according to claim 1, wherein the light source unit comprises at least a left light source unit and a right light source unit, wherein the left light source unit first light guide member extends forwardly along the inner side face of the left main frame member, the left light source unit second light guide member extends rearwardly along the inner side face of the left seat frame, the right light source unit first light guide unit extends forwardly along the inner side face of the right frame member, and the right light source unit second light guide member extends rearwardly along the inner side face of the right seat frame.

4. The saddle riding vehicle according to claim 1, wherein the light source unit is cooled by cooling water cooled by a radiator.

5. The saddle riding vehicle according to claim 1, wherein the light source unit is disposed between a power source for driving one of the front and rear wheels and an energy source supplying unit for supplying energy to the power source, and the gap through which the heat sink is exposed to the outside is on a side face of the vehicle.

6. The saddle riding vehicle according to claim 1, further comprising a seat supported by the left and right seat frames, wherein the light source unit is disposed between the seat and the front wheel.

7. A saddle riding vehicle, comprising:
a vehicle body frame including a head pipe defining a steering axis for a front wheel, a pivot shaft supporting a rear wheel through a rocking member, left and right main frame members, left and right pivot frames for supporting the pivot shaft, a seat, and left and right seat frames for supporting the seat;
a vehicle body cover at least partially covering the vehicle body frame;
a light source unit including a laser light source, a driving unit for driving the laser light source to emit light, a heat sink thermally coupled to the laser light source for dissipating heat generated by the light source unit, and a plurality of cooing fins extending from the heat sink and cooled by air flowing through a gap provided between the vehicle body frame and the vehicle body cover, the light source unit being disposed between the left and right main frame members and between the rocking member and the seat;
a light guide unit including at least a first light guide member with a first input end optically coupled to the light source unit and extending forwardly from the light source unit along an inner side face of one of the left and right main frame members to a first output end at toward a front side of the saddle riding vehicle, and a second light guide member with a second input end optically coupled to the light source unit and extending rearwardly from the light source unit along an inner side face of one of the left and right seat frames to a second output end at a rear side of the saddle riding vehicle and
at least two light emission units, each coupled to the first and second output ends of a respective one of the first and second light guide members.

8. The saddle riding vehicle according to claim 7, wherein the light source unit comprises at least a left light source unit and a right light source unit, wherein the left light source unit first light guide member extends forwardly along the inner side face of the left main frame member, the left light source unit second light guide member extends rearwardly along the inner side face of the left seat frame, the right light source unit first light guide unit extends forwardly along the inner side face of the right frame member, and the right light source unit second light guide member extends rearwardly along the inner side face of the right seat frame.

9. The saddle riding vehicle according to claim 7, wherein a battery is disposed below the seat, and the light source unit is disposed behind the battery.

10. The saddle riding vehicle according to claim 7, wherein
the vehicle body cover includes a rear cover that is provided at a rear portion of the vehicle body, and
the rear cover is a rear fender, and the light source unit is attached to the rear fender.

11. The saddle riding vehicle according to claim 10, wherein the rear fender has an opening provided therein, and the heat sink is exposed to an outside through the opening.

12. The saddle riding vehicle according to claim 11, wherein the opening of the rear fender is formed to open downwardly, and the heat sink cooling fins are exposed to the outside through the opening of the rear fender.

* * * * *